United States Patent
Lee

(10) Patent No.: US 11,985,554 B2
(45) Date of Patent: May 14, 2024

(54) METHOD AND APPARATUS FOR PERFORMING MOBILITY RELATED TO DUAL CONNECTIVITY IN WIRELESS COMMUNICATION SYSTEM

(71) Applicant: LG Electronics Inc., Seoul (KR)

(72) Inventor: Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

(21) Appl. No.: 17/299,237

(22) PCT Filed: Jan. 10, 2020

(86) PCT No.: PCT/KR2020/000495
§ 371 (c)(1),
(2) Date: Jun. 2, 2021

(87) PCT Pub. No.: WO2020/145736
PCT Pub. Date: Jul. 16, 2020

(65) Prior Publication Data
US 2022/0046495 A1    Feb. 10, 2022

(30) Foreign Application Priority Data

Jan. 11, 2019  (KR) ........................ 10-2019-0004022

(51) Int. Cl.
*H04W 36/00* (2009.01)
*H04W 36/08* (2009.01)

(52) U.S. Cl.
CPC ... *H04W 36/0069* (2018.08); *H04W 36/0085* (2018.08); *H04W 36/08* (2013.01)

(58) Field of Classification Search
None
See application file for complete search history.

(56) References Cited

U.S. PATENT DOCUMENTS

2014/0126545 A1    5/2014  Tamura et al.
2015/0271713 A1    9/2015  Kim et al.
(Continued)

FOREIGN PATENT DOCUMENTS

WO    WO2018175721    9/2018

OTHER PUBLICATIONS

Catt, "Discussion on IEs included in the embedded RRC message," R2-1816282, 3GPP TSG-RAN WG2 Meeting #104, Spokane, USA, dated Nov. 12-16, 2018, 7 pages.

(Continued)

*Primary Examiner* — Alex Skripnikov
(74) *Attorney, Agent, or Firm* — Fish & Richardson P.C.

(57) ABSTRACT

The present disclosure relates to method and apparatus for performing mobility related to dual connectivity (DC) in wireless communication system. According to an embodiment of the present disclosure, a method performed by a radio access network (RAN) node in a wireless communication system comprises: transmitting a first message comprising secondary node (SN) mobility commands of candidate target primary secondary cells (PScells), each of the SN mobility commands being related to an index; and transmitting a second message comprising the index related to a first SN mobility command of a candidate target PScell among the SN mobility commands, and a second SN mobility command of the candidate target PScell, wherein the second SN mobility command includes parameter values of at least one first entry that are updated from those of the at least one first entry in the first SN mobility command, and excludes parameter values of at least one second entry that are included in the first SN mobility command.

10 Claims, 18 Drawing Sheets

(56) References Cited

U.S. PATENT DOCUMENTS

2016/0044744 A1* 2/2016 Lee ................... H04W 16/32
                                                    370/329
2018/0279193 A1   9/2018 Park et al.
2020/0154326 A1* 5/2020 Deenoo ............... H04W 36/08

OTHER PUBLICATIONS

Ericsson, "Further Analysis of SCell Direct Activation and Direct Hibernation at RRC Configuration during HO," R4-1815738, 3GPP TSG RAN WG4 Meeting # 89, Spokane, WA, USA, dated Nov. 12-16, 2018, 6 pages.
Samsung, "Introducing NR changes for late drop," R2-1817619, 3GPP TSG-RAN2 Meeting #104, Spokane, USA, dated Nov. 12-16, 2018, 54 pages.
Extended European Search Report in European Appln. No. 20738492.6, dated Jan. 4, 2022, 10 pages.

* cited by examiner

FIG. 4
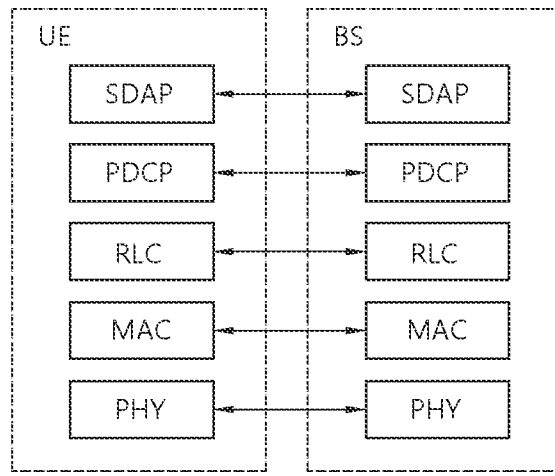
(a) User Plane Protocol Stack
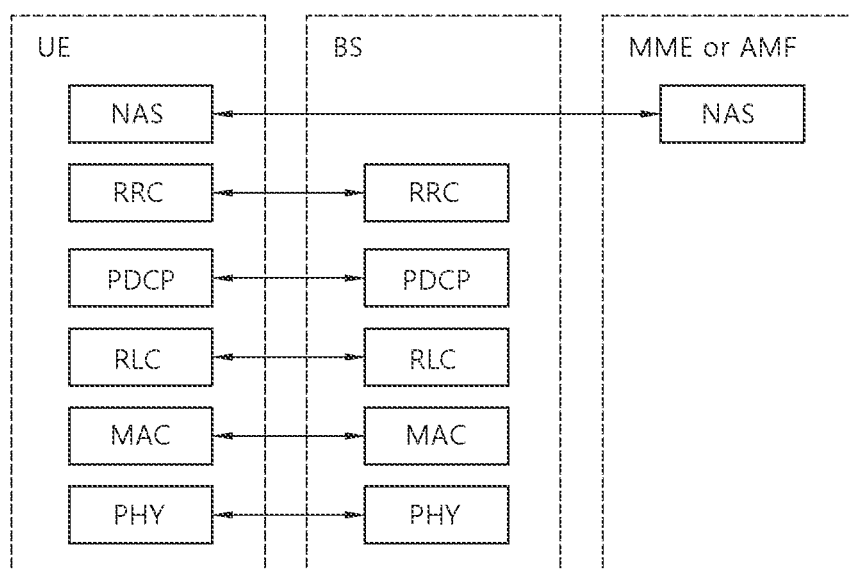
(b) Control Plane Protocol Stack

METHOD AND APPARATUS FOR PERFORMING MOBILITY RELATED TO DUAL CONNECTIVITY IN WIRELESS COMMUNICATION SYSTEM

CROSS-REFERENCE TO RELATED APPLICATIONS

This application is a National Stage application under 35 U.S.C. § 371 of International Application No. PCT/KR2020/000495, filed on Jan. 10, 2020, which claims the benefit of Korean Patent Application No. 10-2019-0004022, filed on Jan. 11, 2019. The disclosures of the prior applications are incorporated by reference in their entirety.

BACKGROUND OF THE DISCLOSURE

Field of the Disclosure

The present disclosure relates to method and apparatus for performing mobility related to dual connectivity (DC) in wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a wireless device and/or user equipment (UE) may move along cells/base stations deployed in a wide range of areas. To provide proper services to the wireless device, the network should manage a mobility of the wireless device, and the wireless device should perform a mobility to another cell according to the mobility management. For example, the network may control a secondary node (SN) addition for the wireless device, when there exists a radio access network (RAN) node which can serve the wireless device with a good signal quality as a SN for the wireless. For another example, the network may control an SN change from a SN currently serving the wireless device to another SN with better signal quality than the current SN. The wireless may need to receive SN mobility command(s) from the network, and apply the SN mobility command(s) to perform a SN change and/or SN addition for the target cell.

SUMMARY OF THE DISCLOSURE

Technical Problem

An aspect of the present disclosure is to provide method and apparatus for performing mobility related to DC in a wireless communication system.

Another aspect of the present disclosure is to provide method and apparatus for delta configuration (i.e., configuration update) of RRC reconfiguration in a wireless communication system.

Yet another aspect of the present disclosure is to provide method and apparatus for signalling of the delta configuration in a wireless communication system.

Yet another aspect of the present disclosure is to provide method and apparatus for delta configuration of SN mobility command in a SN mobility procedure in a wireless communication system.

Yet another aspect of the present disclosure is to provide method and apparatus for delta configuration of SN mobility command in a SN mobility procedure in a wireless communication system.

Technical Solution

According to an embodiment of the present disclosure, a method performed by a wireless device in a wireless communication system comprises: receiving a first message comprising secondary node (SN) mobility commands of candidate target primary secondary cells (PScells), each of the SN mobility commands being related to an index; receiving a second message comprising the index related to a first SN mobility command of a candidate target PScell among the SN mobility commands, and a second SN mobility command of the candidate target PScell; updating the first SN mobility command based on the SN second mobility command; identifying that the candidate target PScell satisfies a SN mobility condition for the candidate target PScell based on a measurement result for the candidate target PScell; and performing a SN mobility to the candidate target PScell satisfying the SN mobility condition based on the updated first SN mobility command.

According to an embodiment of the present disclosure, a wireless device in a wireless communication system comprises: a transceiver; a memory; and at least one processor operatively coupled to the transceiver and the memory, and configured to: control the transceiver to receive a first message comprising secondary node (SN) mobility commands of candidate target primary secondary cells (PScells), each of the SN mobility commands being related to an index, control the transceiver to receive a second message comprising the index related to a first SN mobility command of a candidate target PScell among the SN mobility commands, and a second SN mobility command of the candidate target PScell, update the first SN mobility command based on the SN second mobility command, identify that the candidate target PScell satisfies a SN mobility condition for the candidate target PScell based on a measurement result for the candidate target PScell, and perform a SN mobility to the candidate target PScell satisfying the SN mobility condition based on the updated first SN mobility command.

According to an embodiment of the present disclosure, a method performed by a radio access network (RAN) node in a wireless communication system comprises: transmitting a first message comprising secondary node (SN) mobility commands of candidate target primary secondary cells (PScells), each of the SN mobility commands being related to an index; and transmitting a second message comprising the index related to a first SN mobility command of a candidate target PScell among the SN mobility commands, and a second SN mobility command of the candidate target PScell, wherein the second SN mobility command includes parameter values of at least one first entry that are updated from those of the at least one first entry in the first SN mobility command, and excludes parameter values of at least one second entry that are included in the first SN mobility command.

According to an embodiment of the present disclosure, a radio access network (RAN) node in a wireless communication system comprises: a transceiver; a memory; and at least one processor operatively coupled to the transceiver and the memory, and configured to: control the transceiver to transmit a first message comprising secondary node (SN) mobility commands of candidate target primary secondary cells (PScells), each of the SN mobility commands being related to an index, and control the transceiver to transmit a second message comprising the index related to a first SN mobility command of a candidate target PScell among the SN mobility commands, and a second SN mobility command of the candidate target PScell, wherein the second SN mobility command includes parameter values of at least one first entry that are updated from those of the at least one first entry in the first SN mobility command, and excludes parameter values of at least one second entry that are included in the first SN mobility command.

According to an embodiment of the present disclosure, a processor for a wireless device in a wireless communication system is provided. The processor is configured to control the wireless device to perform operations comprising: receiving a first message comprising secondary node (SN) mobility commands of candidate target primary secondary cells (PScells), each of the SN mobility commands being related to an index; receiving a second message comprising the index related to a first SN mobility command of a candidate target PScell among the SN mobility commands, and a second SN mobility command of the candidate target PScell; updating the first SN mobility command based on the SN second mobility command; identifying that the candidate target PScell satisfies a SN mobility condition for the candidate target PScell based on a measurement result for the candidate target PScell; and performing a SN mobility to the candidate target PScell satisfying the SN mobility condition based on the updated first SN mobility command.

According to an embodiment of the present disclosure, a computer-readable medium having recorded thereon a program for performing each step of a method on a computer is provided. The method comprises: receiving a first message comprising secondary node (SN) mobility commands of candidate target primary secondary cells (PScells), each of the SN mobility commands being related to an index; receiving a second message comprising the index related to a first SN mobility command of a candidate target PScell among the SN mobility commands, and a second SN mobility command of the candidate target PScell; updating the first SN mobility command based on the SN second mobility command; identifying that the candidate target PScell satisfies a SN mobility condition for the candidate target PScell based on a measurement result for the candidate target PScell; and performing a SN mobility to the candidate target PScell satisfying the SN mobility condition based on the updated first SN mobility command.

Advantageous Effect

The present disclosure can have various advantageous effects.

For example, by transmitting an updated SN mobility command including updated configuration parameters and excluding configuration parameters included in a previously transmitted SN mobility command (i.e., configuration parameters that are not updated or remain the same), the network can send a SN mobility command of reduced sized to the wireless device, in particular when multiple target cells are configured for conditional SN mobility.

For example, it is beneficial to reduce signalling overhead in case when multiple target cells are configured for conditional SN mobility or when conditional SN mobility command is updated that the network transmits an updated SN mobility command including updated configuration parameters and excluding configuration parameters included in a previously transmitted SN mobility command (i.e., configuration parameters that are not updated or remain the same).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 4 illustrates an example of protocol stacks in a 3GPP based wireless communication system.

DESCRIPTION OF EXEMPLARY EMBODIMENTS

Figure 1:
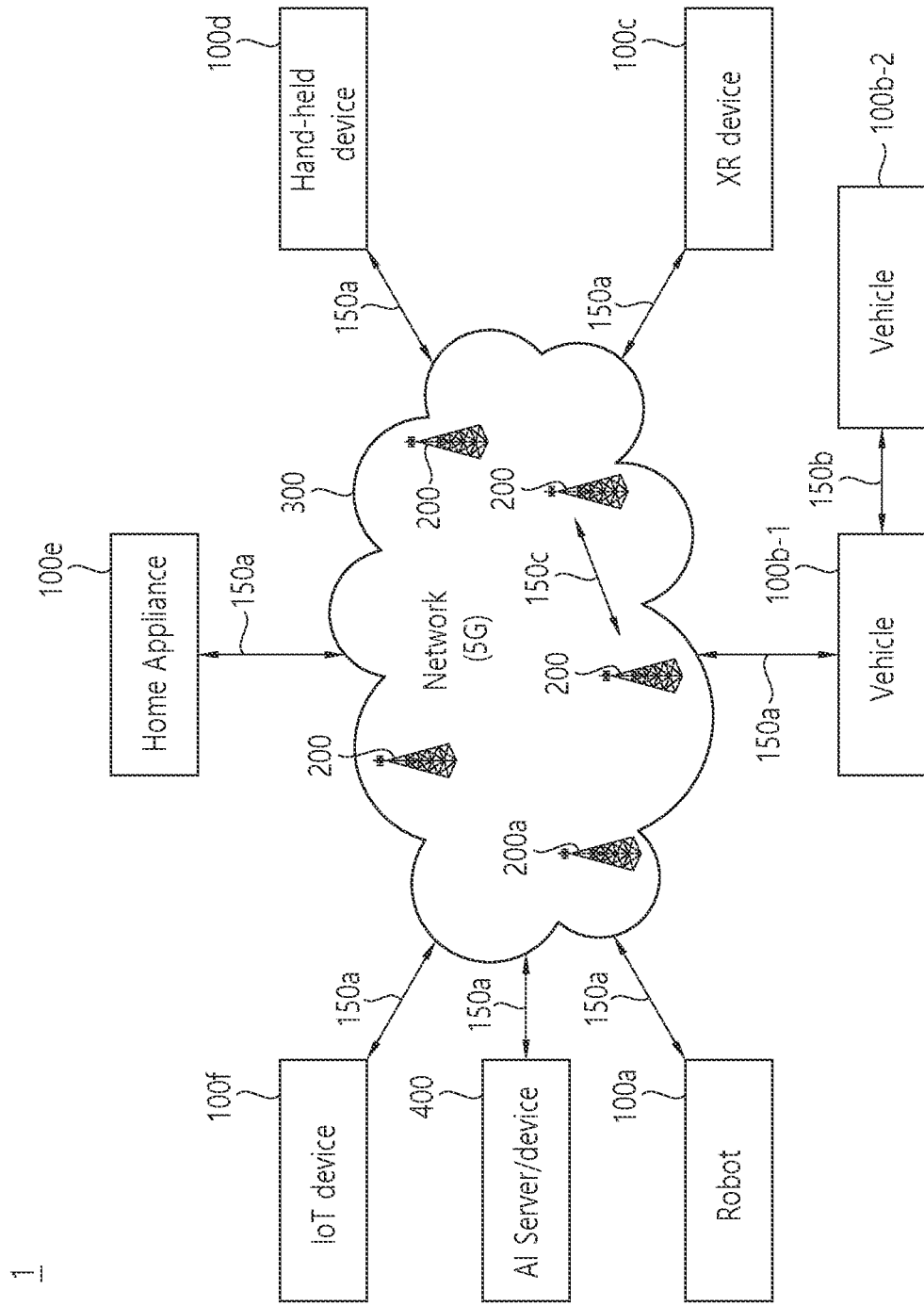
FIG. 1 illustrates an example of a communication system 1 to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying RRC reconfiguration parameters in the mobility command of the target cell. Further, RRC reconfiguration and RRC connection reconfiguration may be used interchangeably.

'SN mobility' refers to a procedure for i) changing a PSCell of a UE (i.e., SN change or PSCell change), and/or ii) adding a PSCell for a UE (i.e., SN addition or PSCell addition). Therefore, the SN mobility may comprise at least one of an SN change or an SN addition. In other words, the SN mobility may comprise at least one of PSCell change or PSCell addition. Throughout the disclosure, performing an SN mobility to a target cell may refer to applying an SN mobility command of the target cell or applying RRC reconfiguration parameters in the SN mobility command of the target cell. The SN mobility may be a kind of a mobility. The SN mobility command may comprise a SN change command for performing SN change, or SN addition command for performing SN addition.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of an event, time-to-trigger (TTT), offset value, or threshold value(s). The mobility condition for an event may be satisfied if an entering condition for the event is satisfied for at least the TTT. For example, the entering condition for event A3 may be satisfied if a signal quality for a target cell is better than that for a source cell more than or equal to the offset value. For another example, the entering condition for event A5 may be satisfied if a signal quality for a target cell is better than a first threshold and a signal quality for a source cell is lower than a second threshold.

'SN mobility condition for a target cell' refers to a triggering condition for an SN mobility (i.e., SN addition or SN change) to the target cell. That is, the SN mobility condition for a target cell refers to a condition that should be satisfied for triggering an SN mobility to the target cell. SN mobility condition for a target cell may be classified as:

i) SN addition condition for a target cell, which refers to a triggering condition for an SN addition of the target cell; or ii) SN change condition for a target cell, which refers to a triggering condition for an SN change to the target cell.

SN mobility condition may comprise at least one of an event, time-to-trigger (TTT), offset value, or threshold value(s). The SN mobility condition for an event may be satisfied if an entering condition for the event is satisfied for at least the TTT.

For example, SN addition condition may be related to event A4 or event B1. The entering condition for event A4 or B1 may be satisfied if a signal quality for a target cell is better than a threshold.

For example, SN change condition may be related to event A3 or event A5. The entering condition for event A3 may be satisfied if a signal quality for a target cell is better than that for a source PScell more than or equal to the offset value. For another example, the entering condition for event A5 may be satisfied if a signal quality for a target cell is better than a first threshold and a signal quality for a source PScell is lower than a second threshold.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying RRC reconfiguration parameters in the conditional mobility command of the target cell which satisfies a mobility condition for the target cell among the plurality of candidate target cells.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200*a* may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a* and 150*b* may be established between the wireless devices 100*a* to 100*f*/BS 200-BS 200. Herein, the wireless communication/connections may be established through various RATs (e.g., 5G NR) such as uplink/downlink communication 150*a* and sidelink communication 150*b* (or D2D communication). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
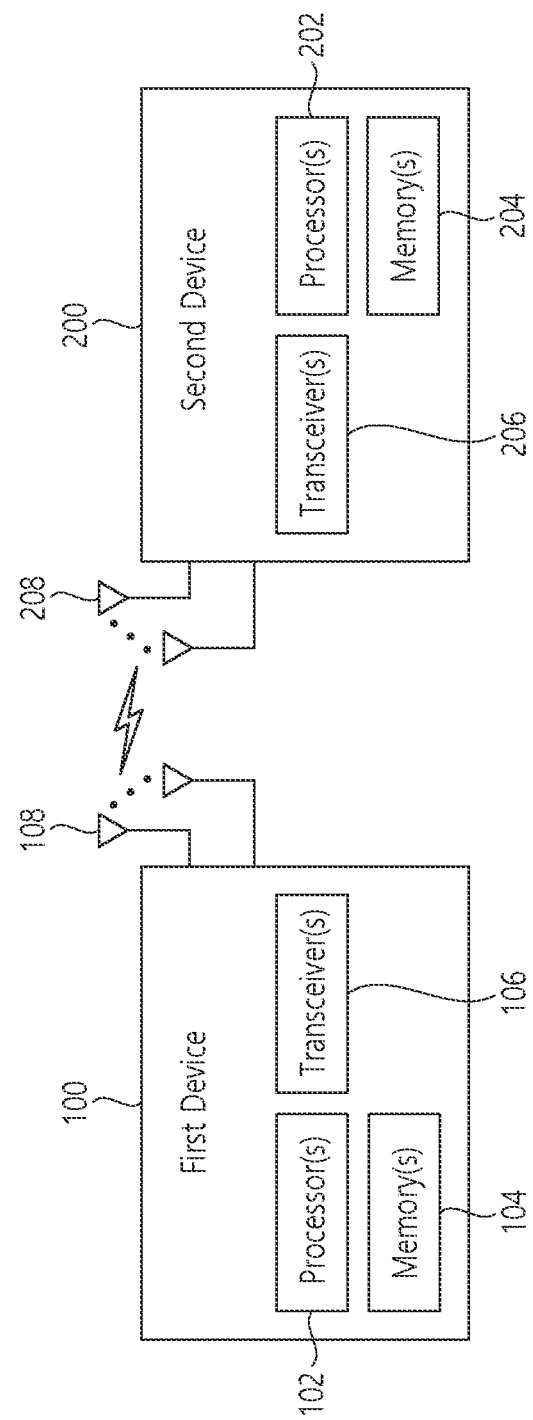
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

In the present disclosure, a BS is also referred to as a node B (NB), an eNode B (eNB), or a gNB.

Figure 3:
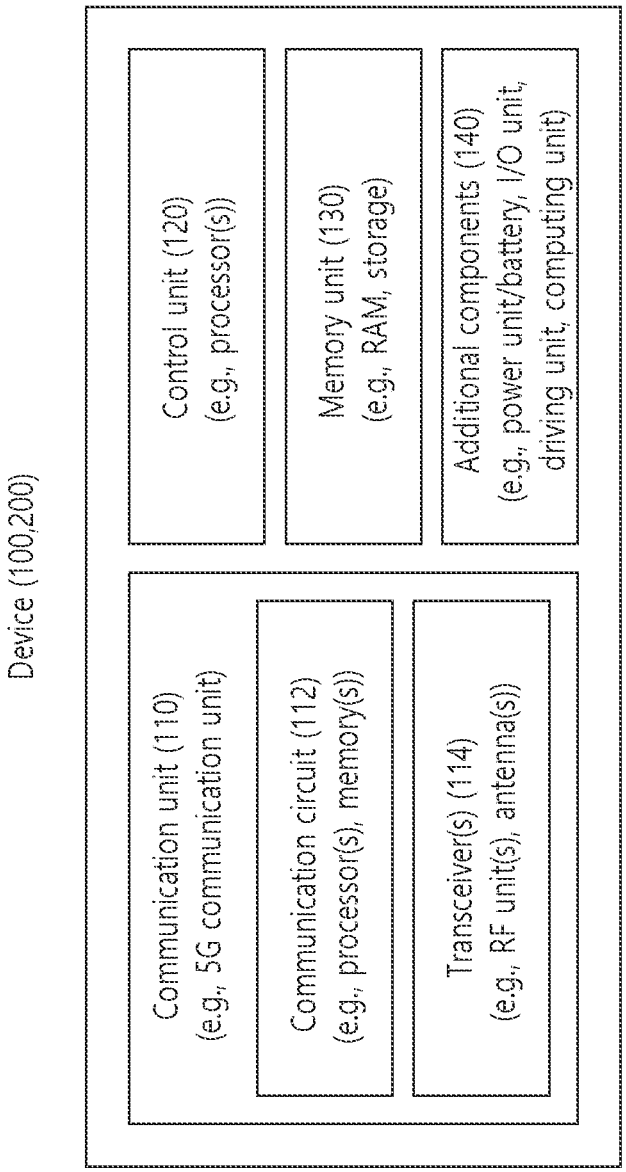
FIG. 3 illustrates another example of a wireless device applied to the present disclosure.

FIG. 3 illustrates another example of a wireless device applied to the present disclosure. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

FIG. 4 illustrates an example of protocol stacks in a 3GPP based wireless communication system.

In particular, FIG. 4(a) illustrates an example of a radio interface user plane protocol stack between a UE and a base station (BS) and FIG. 4(b) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(a), the user plane protocol stack may be divided into a first layer (Layer 1) (i.e., a physical (PHY) layer) and a second layer (Layer 2). Referring to FIG. 4(b), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

In the 3GPP LTE system, the layer 2 is split into the following sublayers: Medium Access Control (MAC), Radio Link Control (RLC), and Packet Data Convergence Protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network QoS flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of Signalling Radio Bearers (SRBs) and Data Radio Bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
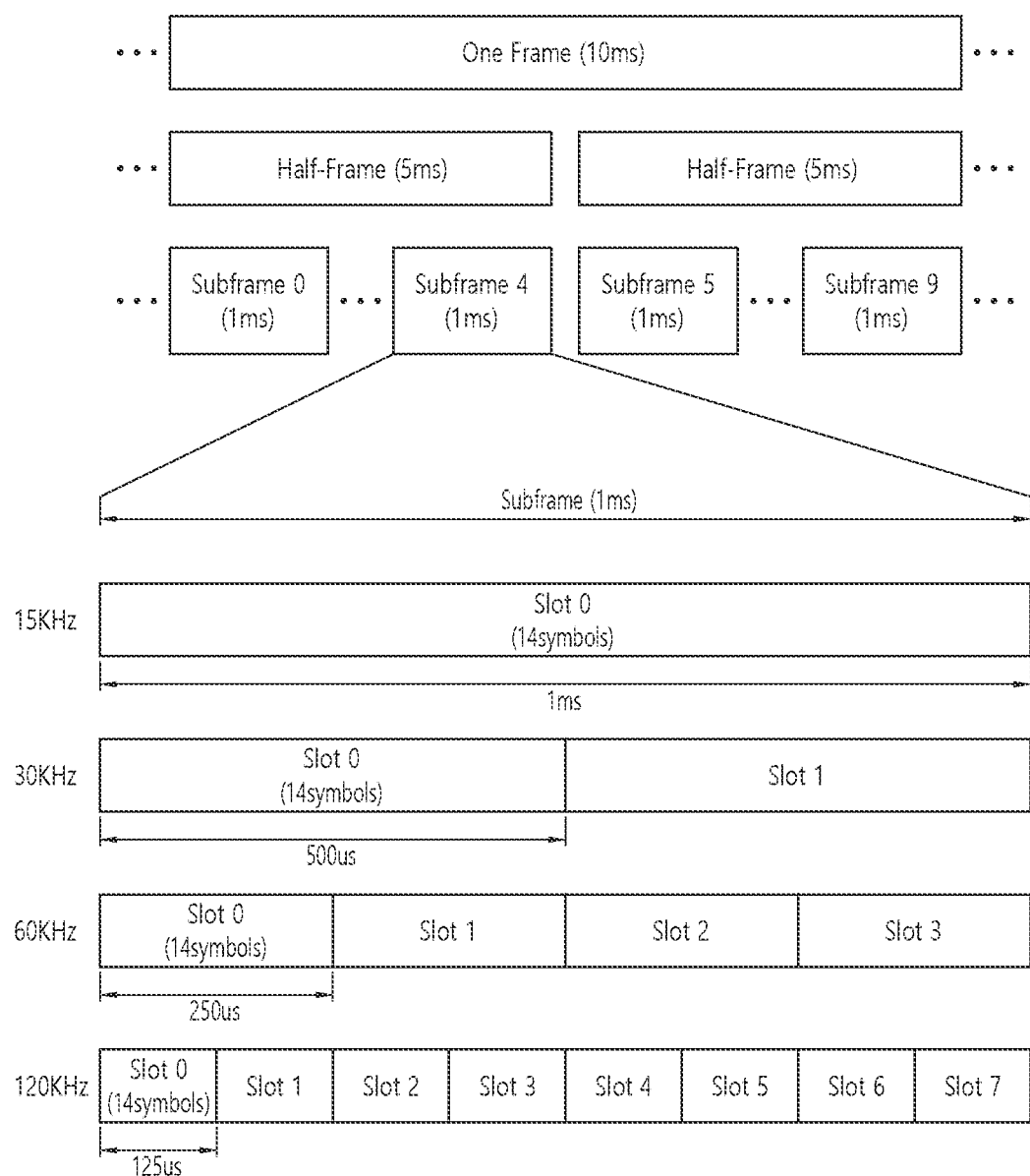
FIG. 5 illustrates a frame structure in a 3GPP based wireless communication system.

FIG. 5 illustrates a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing $\Delta f=2u*15$ kHz.

TABLE 3

| u | Nslotsymb | Nframe,uslot | Nsubframe,uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz.

TABLE 4

| u | Nslotsymb | Nframe,uslot | Nsubframe,uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid,x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with dual connectivity (DC). For a UE in RRC_CONNECTED not configured with CA/DC there is only one serving cell comprised of the PCell. For a UE in RRC_CONNECTED configured with CA/DC the term "serving cells" is used to denote the set of cells comprised of the SpCell(s) and all SCells. In DC, two MAC entities are configured in a UE: one for the MCG and one for the SCG.

Figure 6:
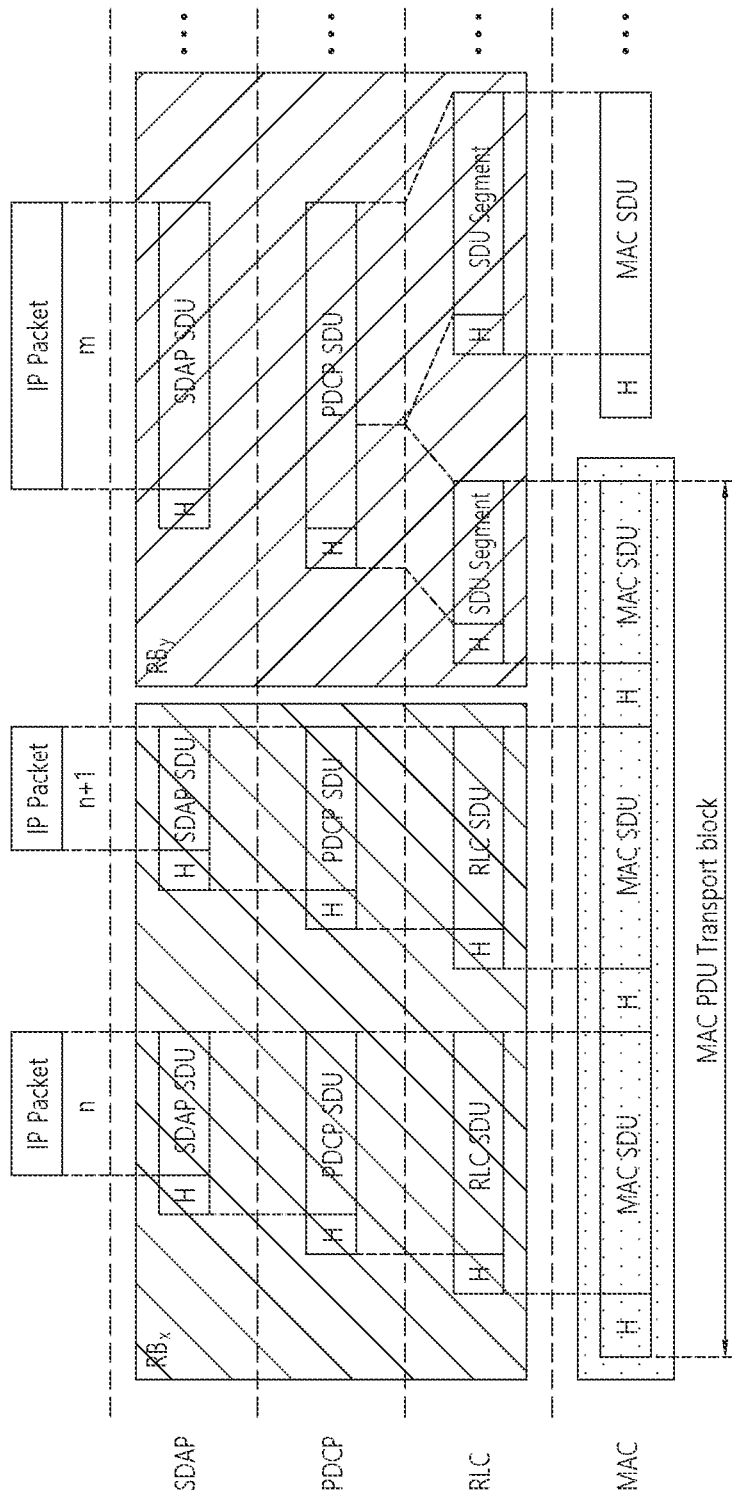
FIG. 6 illustrates a data flow example in the 3GPP NR system.

FIG. 6 illustrates a data flow example in the 3GPP NR system.

In FIG. 6, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 7:
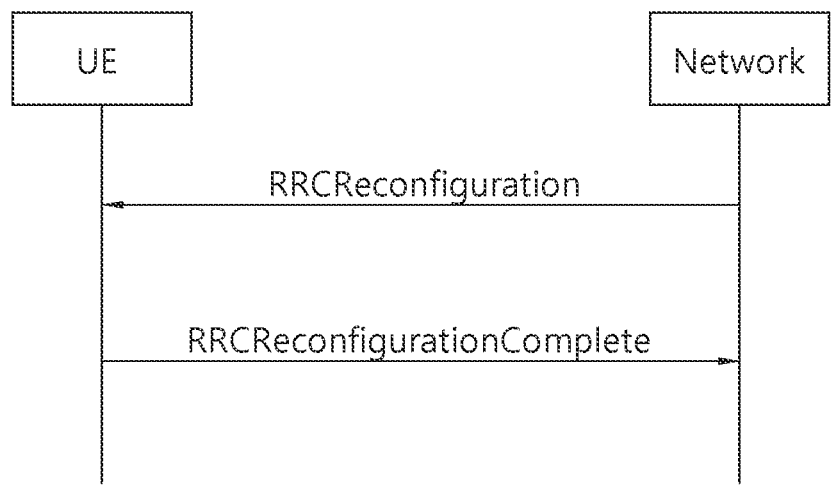
FIG. 7 shows an example of RRC reconfiguration procedure if the RRC reconfiguration is successful to which technical features of the present disclosure can be applied.

FIG. 7 shows an example of RRC reconfiguration procedure if the RRC reconfiguration is successful to which technical features of the present disclosure can be applied.

Referring to FIG. 7, in step S701, the network may transmit an RRCReconfiguration message to the UE. For example, a source RAN node may transmit the RRCReconfiguration message comprising a SN mobility command of a target RAN node for a SN mobility to the target RAN node.

In step S703, if RRC reconfiguration is successful, the UE may transmit an RRCReconfigurationComplete message to the network. The RRCReconfigurationComplete message may comprise a SN mobility complete message which informs that the UE successfully performed a SN mobility to the target RAN node. For example, if the UE successfully performed a SN mobility to the target RAN node—that is, if the UE successfully applied the SN mobility command of the target RAN node, the UE may transmit the SN mobility complete message to the target RAN node.

Figure 8:
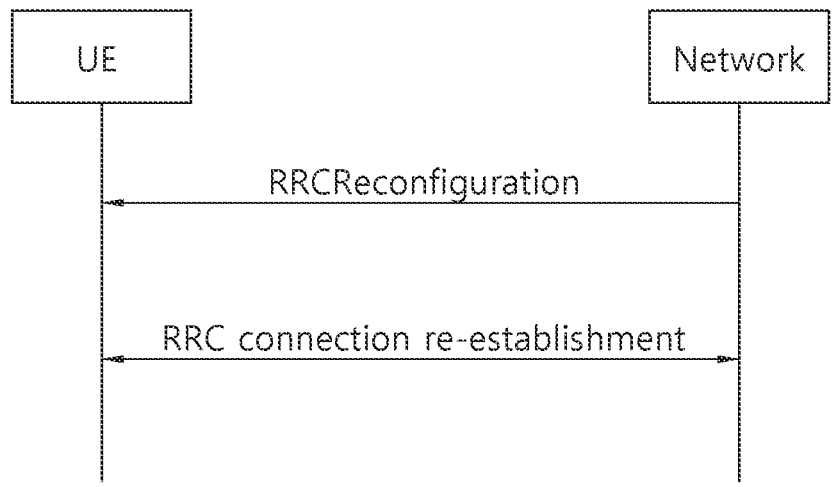
FIG. 8 shows an example of RRC reconfiguration procedure if the RRC reconfiguration fails to which technical features of the present disclosure can be applied.

FIG. 8 shows an example of RRC reconfiguration procedure if the RRC reconfiguration fails to which technical features of the present disclosure can be applied.

Referring to FIG. 8, in step S801, the network may transmit an RRCReconfiguration message to the UE. For example, a source RAN node may transmit the RRCReconfiguration message comprising a SN mobility command of a target RAN node for a SN mobility to the target RAN node.

In step S803, if RRC reconfiguration fails, the UE and the network may perform RRC connection re-establishment. For example, if the UE fails to perform a SN mobility to the target RAN node—that is, if the UE fails to apply the SN mobility command of the target RAN node, the UE and the source RAN node may perform RRC connection re-establishment.

The purpose of the RRC reconfiguration procedure as illustrated in FIGS. 7 and 8 may be to modify an RRC connection, e.g. to establish/modify/release RBs, to perform reconfiguration with sync, to setup/modify/release measurements, to add/modify/release SCells and cell groups. As part of the procedure, NAS dedicated information may be transferred from the Network to the UE.

In E-UTRAN—NR (EN)-dual connectivity (DC), SRB3 can be used for measurement configuration and reporting, to (re-)configure MAC, RLC, physical layer and RLF timers and constants of the SCG configuration, and to reconfigure PDCP for DRBs associated with the S-KgNB or SRB3, provided that the (re-)configuration does not require any MeNB involvement.

The network may initiate the RRC reconfiguration procedure to the UE in RRC_CONNECTED. The network may apply the procedure as follows:

The establishment of RBs (other than SRB1, that is established during RRC connection establishment) is performed only when AS security has been activated;

The addition of Secondary Cell Group and SCells is performed only when AS security has been activated;

The reconfigurationWithSync is included in secondaryCellGroup only when at least one DRB is setup in SCG.

Figure 9:
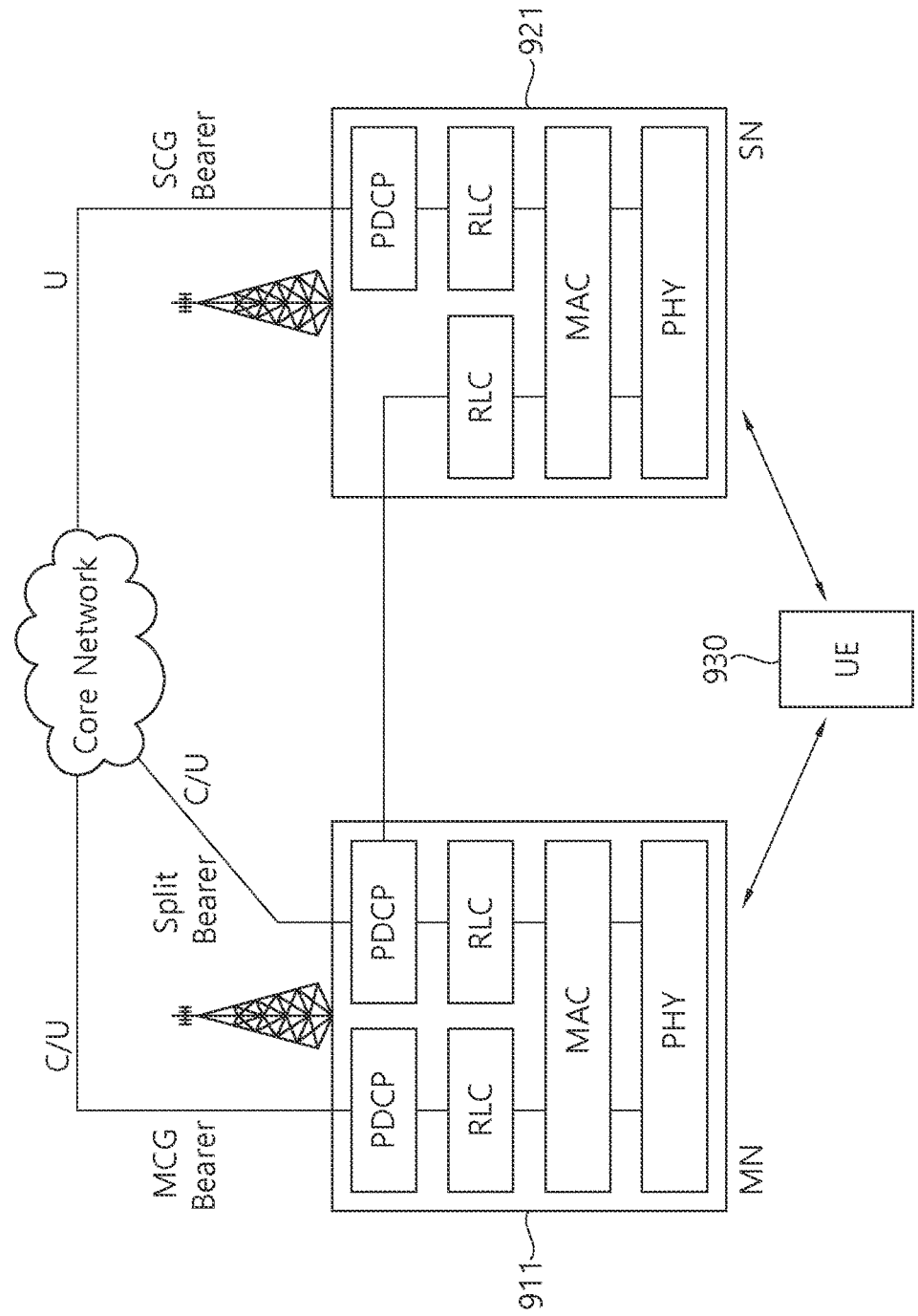
FIG. 9 shows an example of a dual connectivity (DC) architecture to which technical features of the present disclosure can be applied.

FIG. 9 shows an example of a dual connectivity (DC) architecture to which technical features of the present disclosure can be applied. In FIG. 9 and throughout the disclosure, 'radio access network (RAN) node' refers to a network entity to which a wireless device can access through a radio channel. Examples of the RAN node may comprise a gNB, eNB, base station, and/or cell.

Referring to FIG. 9, MN 911, SN 921, and a UE 930 communicating with both the MN 911 and the SN 921 are illustrated. As illustrated in FIG. 9, DC refers to a scheme in which a UE (e.g., UE 930) utilizes radio resources provided by at least two RAN nodes comprising a MN (e.g., MN 911) and one or more SNs (e.g., SN 921). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 911) refers to a main RAN node providing services to a UE in DC situation. SN (e.g., SN 921) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 9, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 9, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 9, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 9, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Figure 10:
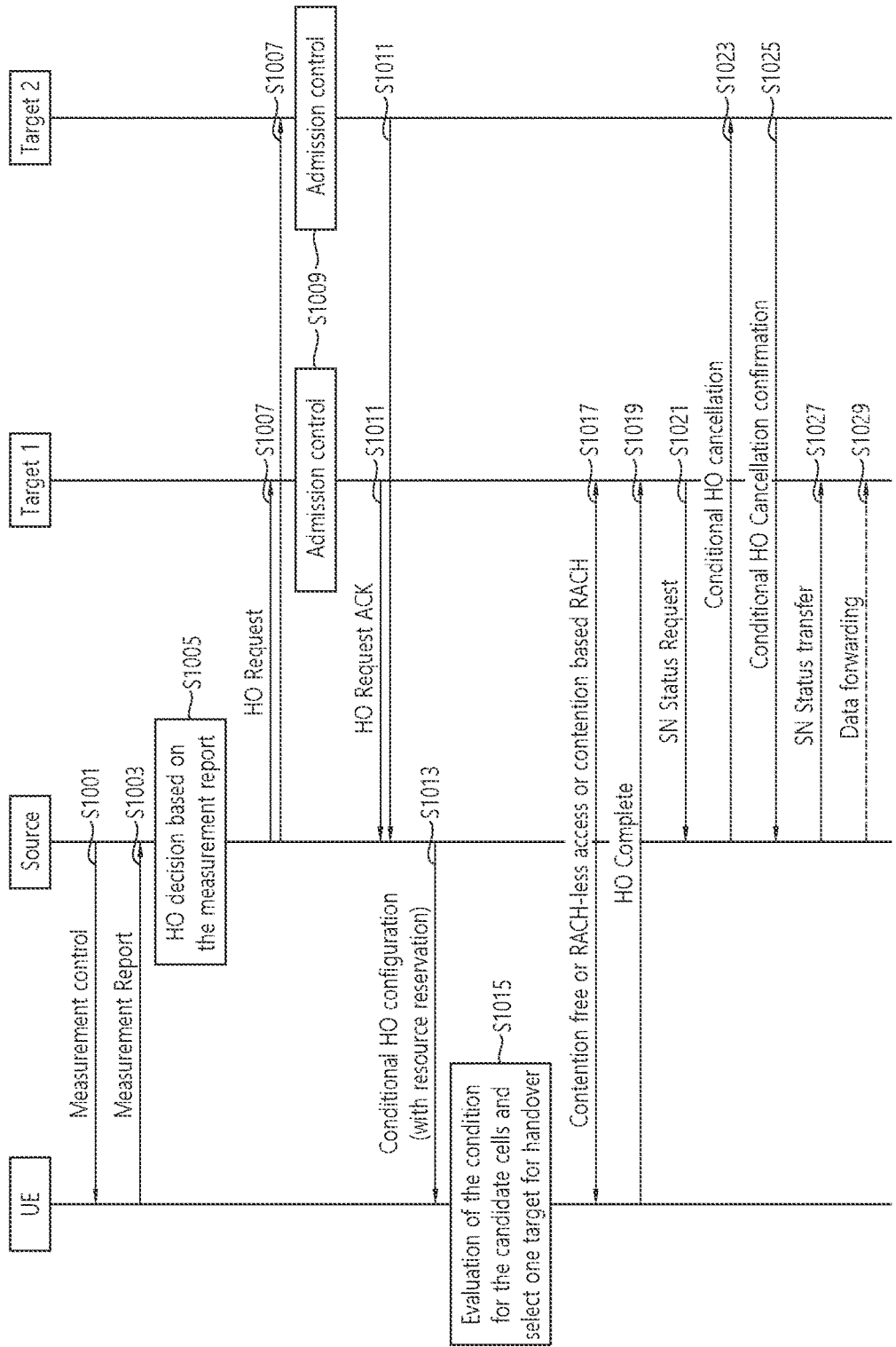
FIG. 10 shows an example of a conditional handover procedure to which technical features of the present disclosure can be applied.

FIG. 10 shows an example of a conditional handover procedure to which technical features of the present disclosure can be applied. FIG. 10 illustrates steps for the conditional handover procedure exemplary, but the illustrated steps can also be applied to a conditional SN mobility procedure (e.g., conditional SN addition procedure and/or conditional SN change procedure).

Referring to FIG. 10, in step S1001, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1003, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1001.

In step S1005, the source cell may make a handover (HO) decision based on the measurement report. For example, the source cell may make a HO decision and determine candidate target cells (e.g., target cell 1 and target cell 2) for HO among neighbor cells around the UE based on a result of measurement (e.g., signal quality, reference signal received power (RSRP), reference signal received quality (RSRP)) on the neighbor cells.

In step S1007, the source cell may transmit HO request messages to the target cell 1 and the target cell 2 which are determined in step S1005. That is, the source cell may perform handover preparation with the target cell 1 and the target cell 2. The HO request message may comprise necessary information to prepare the handover at the target side (e.g., target cell 1 and target cell 2).

In step S1009, each of the target cell 1 and the target cell 2 may perform an admission control based on information included in the HO request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1011, the target cell and the target cell 2 may transmit a HO request acknowledge (ACK) message to the source cell. The HO request ACK message may comprise information on resources reserved and prepared for a handover. For example, the HO request ACK message may comprise a transparent container to be sent to the UE as an RRC message to perform the handover. The container may include a new C-RNTI, target gNB security algorithm identifiers for the selected security algorithms, a dedicated RACH preamble, and/or possibly some other parameters i.e. access parameters, SIBs. If RACH-less handover is configured, the container may include timing adjustment indication and optionally a preallocated uplink grant. The HO request ACK message may also include RNL/TNL information for forwarding tunnels, if necessary. As soon as the source cell receives the HO request ACK message, or as soon as the transmission of the handover command is initiated in the downlink, data forwarding may be initiated.

In step S1013, the source cell may transmit a conditional HO (CHO) configuration to the UE. The CHO configuration may be also referred to as conditional reconfiguration. The CHO configuration may comprise a CHO configuration for each of the candidate target cells (e.g., target cell 1, target cell 2). For example, the CHO configuration may comprise a CHO configuration for the target cell 1, and a CHO configuration for the target cell 2. The CHO configuration for the target cell 1 may comprise a handover condition for the target cell 1, and a handover command of the target cell 1. The handover command of the target cell 1 may comprise RRC reconfiguration parameters for a handover to the target cell 1, including information on resources reserved for the handover to the target cell 1. Similarly, the CHO configuration for the target cell 2 may comprise a handover condition for the target cell 2, and a handover command of the target cell 2. The handover command of the target cell 2 may comprise RRC reconfiguration parameters for a handover to the target cell 2, including information on resources reserved for the handover to the target cell 2.

In step S1015, the UE may perform an evaluation of the handover condition for the candidate target cells (e.g., target cell 1, target cell 2) and select a target cell for handover among the candidate target cells. For example, the UE may perform measurements on the candidate target cells, and determine whether a candidate target cell satisfies a handover condition for the candidate target cell among the candidate target cells based on a result of the measurements on the candidate target cells. If the UE identifies that the target cell 1 satisfies a handover condition for the target cell 1, the UE may select the target cell 1 as a target cell for the handover.

In step S1017, the UE may perform a random access to the selected target cell (e.g., target cell 1). For example, the UE may transmit a random access preamble to the target cell 1, and receive a random access response comprising an uplink grant from the target cell 1. If RACH-less handover is configured, the step S1017 may be omitted, and the uplink grant may be provided in step S1013.

In step S1019, the UE may transmit a HO complete message to the target cell 1. When the UE has successfully accessed the target cell 1 (or, received uplink grant when RACH-less HO is configured), the UE may transmit a HO complete message comprising a C-RNTI to confirm the handover, along with uplink buffer status report, whenever possible, to the target cell 1 to indicate that the handover procedure is completed for the UE. The target cell 1 may verify the C-RNTI transmitted in the HO complete message.

In step S1021, the target cell 1 may transmit a sequence number (SN) status request message to the source cell. The target cell 1 may request the source cell to inform the target cell 1 of a SN of a packet the target cell 1 has to transmit after the handover, via the SN status request message.

In step S1023, the source cell may transmit a CHO cancellation message to the target cell 2 which is not selected as a target cell for a handover among the candidate target cells. After receiving the CHO cancellation message, the target cell 2 may release resources that are reserved in case of a handover.

In step S1025, the target cell 2 may transmit a CHO cancellation confirmation message to the source cell, as a response for the CHO cancellation message. The CHO cancellation confirmation message may inform that the target cell 2 has released resources reserved in case of a handover.

In step S1027, the source cell may transmit a SN status transfer message to the target cell 1, as a response for the SN status request message. The SN status transfer message may inform the target cell 1 of a SN of a packet the target cell 1 has to transmit after the handover.

In step S1029, the source cell may perform a data forwarding to the target cell 1. For example, the source cell may forward data received from a core network to the target cell 1 so that the target cell 1 can now transmit the data to the UE.

For conditional handover, UE may report many cells or beams as the possible candidate HO targets based on the radio resource management (RRM) measurement. gNB may issue the conditional handover commands for one or multiple candidate target cells reported by the UE. Within the CHO configuration, the candidate target cells may be configured with different HO conditions (e.g., event, TTT, offset value, to-be-measured RS and/or threshold) and possibly uplink access resources for UE access (e.g. random access preambles).

As illustrated in FIG. 10, when the UE receives a CHO configuration (including a handover command for the conditional handover), the UE may start evaluating the handover condition for CHO while continuing to operate based on current RRC configuration of the UE. When the UE determines that the HO condition for conditional HO is fulfilled, the UE may disconnect from the source cell, and apply the CHO configuration and access to the target cell.

From the network side, the base station related to the source cell may need to prepare the handover with one or multiple target cells. For example, the source cell may need to request the candidate target cell(s) to perform admission control and reserve the radio resources accordingly. There may be multiple options (on the exact time point) for the source cell to stop data transmission to the UE, and to start data forwarding to the candidate target cells. The source cell will know the exact target cell for the UE after the target cell indicates to the source cell that it is selected as the exact target cell when the handover procedure is successfully executed.

CHO is essentially a network-configured but UE-controlled downlink mobility mechanism with a potential to reduce the interruption time and handover failure (HOF)/radio link failure (RLF).

The HO condition may not be fulfilled for a long time period and hence the UE will stay in the source cell. In this case, the source cell must have the possibility to perform further reconfigurations either to change the UE operation in the current source cell or to command the UE to handover to a suitable target cell.

If conditional handover is configured, UE may receive multiple handover commands for multiple target cells, and will finally select a single target cell to perform handover.

According to conditional handover procedure as illustrated in FIG. 10, one or more RRC reconfiguration messages to be transmitted to the UE may include multiple handover commands. Thus, signaling overhead may be expected to be significant for support of conditional handover.

In the conditional handover procedure, UE may receive a first configuration from a source cell and then receive handover command including a second configuration from the target cell. Upon receiving the second configuration after applying the first configuration with a configured parameter value, if the configured parameter value is absent in the second configuration, UE maintains the configured parameter value of the first configuration after applying the second configuration i.e. after completing handover to the target cell.

Various embodiments of the present disclosure can be applied to conditional mobility, in which one or more candidate cells are determined based on a mobility condition first, and actual mobility is performed towards one of the candidate cells. The conditional mobility may include conditional handover, conditional SCG change, and/or conditional SCG addition. The mobility command may be a message used for 'reconfiguration with sync'.

Figure 11:
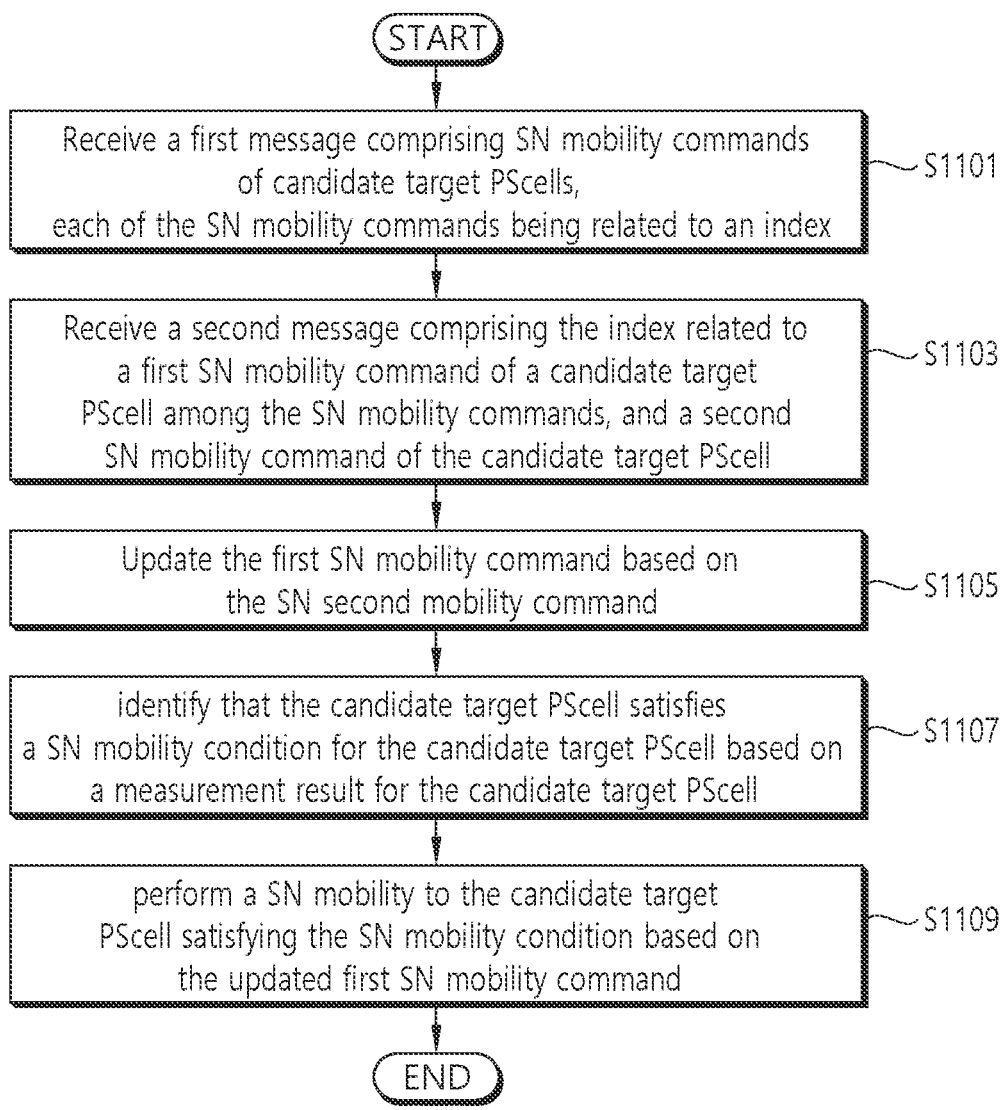
FIG. 11 shows an example of a method for SN mobility according to an embodiment of the present disclosure.

FIG. 11 shows an example of a method for SN mobility according to an embodiment of the present disclosure. The steps illustrated in FIG. 11 may be performed by a wireless device and/or UE.

Referring to FIG. 11, in step S1101, the wireless device may receive a first message comprising SN mobility commands of candidate target PScells, each of the SN mobility commands being related to an index. The index may also be referred to as configuration identity. The first message may be a conditional reconfiguration message or CHO configuration message. Throughout the disclosure, the candidate target PScell can be simply referred to as target cell.

In step S1103, the wireless device may receive a second message comprising the index related to a first SN mobility command of a candidate target PScell among the SN mobility commands, and a second SN mobility command of the candidate target PScell. The second message may be received after the first message is received. The first SN mobility command may comprise RRC reconfiguration parameters for a SN mobility to the candidate target PScell, and the second SN mobility command may comprise one or more updated RRC reconfiguration parameters for a SN mobility to the candidate target PScell. For example, the second SN mobility command may include parameter values of at least one first entry that are updated from those (or, different from) of the at least one first entry in the first SN mobility command, and excludes parameter values of at least one second entry that are included in the first SN mobility command. That is, the parameter values of the at least one second entry in the first SN mobility command may not be included in the second SN mobility command.

In step S1105, the wireless device may update the first SN mobility command based on the second SN mobility command. For example, the wireless device may identify, in the first SN mobility command, the parameter values of the at least one second entry that are excluded in the second SN mobility command. Then, the wireless device may add the parameter values of the at least one second entry to the second SN mobility command to obtain an updated version of the first SN mobility command. For another example, the wireless device may replace the parameter values of the at least one first entry in the first SN mobility command with those of the at least one first entry in the second SN mobility command to obtain an updated version of the first SN mobility command. Herein, the updated version of the first SN mobility command may also be referred to as updated first SN mobility command. Therefore, the updated first SN mobility command may comprise parameter values of at least one first entry included in the second SN mobility command, and parameter values of at least one second entry included in the first SN mobility command.

In step S1107, the wireless device may identify that the candidate target PScell satisfies a SN mobility condition for the candidate target PScell based on a result of a measurement on the candidate target PScell. The wireless device may determine whether the candidate target PScell satisfies a SN mobility condition for the candidate target PScell or does not satisfy the SN mobility condition for the candidate target PScell based on a result of a measurement on the candidate target PScell (e.g., signal quality, RSRP, RSRQ).

In step S1109, the wireless device may perform a SN mobility to the candidate target PScell satisfying the SN mobility condition based on the updated first SN mobility command. The wireless device may apply the updated first SN mobility command of the candidate target PScell satisfying the SN mobility condition to perform a SN mobility to the candidate target PScell.

According to various embodiments, the first message may comprise at least one of a SN mobility command of each of the candidate target PScells, an index related to the SN mobility command, or a SN mobility condition for each of the candidate target PScells. For example, the first message may comprise at least one of the first SN mobility command of the candidate target PScell, the index related to the first SN mobility command, or a SN mobility condition for the candidate target PScell. The SN mobility condition may be a triggering condition for a SN mobility to a target cell.

According to various embodiments, the index related to a SN mobility command may comprise an index of a candidate target PScell related to the SN mobility command.

According to various embodiments, the wireless device may store the SN mobility commands in the first message. The wireless device may identify, among the stored SN mobility commands, the first SN mobility command related to the index included in the second message. The wireless device may update the identified first SN mobility command based on the second SN mobility command included in the second message.

According to various embodiments, the second SN mobility command may include parameter values of at least one first entry that are updated from (or, different from) those of the at least one first entry in the first SN mobility command, and exclude parameter values of at least one second entry that are included in the first SN mobility command. That is, parameter values of at least one first entry in the second SN mobility command may not be included in the first SN mobility command.

According to various embodiments, the wireless device may identify, in the first SN mobility command, the parameter values of the at least one second entry that are excluded in the second SN mobility command. The wireless device may add the parameter values of the at least one second entry to the second SN mobility command to obtain an updated version of the first SN mobility command (i.e., updated first SN mobility command).

According to various embodiments, the wireless device may replace the parameter values of the at least one first entry in the first SN mobility command with those of the at least one first entry in the second SN mobility command to obtain an updated version of the first SN mobility command.

According to various embodiments, the wireless device may be in communication with a MN and a SN in DC. The wireless device may, upon identifying that the candidate target PScell satisfies a SN change condition for the candidate target PScell, perform a SN change from the SN to another SN related to the candidate target PScell based on the updated first SN mobility command.

According to various embodiments, the wireless device may, upon identifying that the candidate PStarget cell satisfies a SN addition condition for the candidate target PScell, perform a SN addition for a RAN node related to the candidate target PScell based on the updated first SN mobility command (i.e., updated SN addition command). That is, the wireless device may perform a procedure for adding the RAN node related to the candidate target cell as a SN for the wireless device. This procedure causes a RAN node related to a source cell to become a MN, and the wireless device to be in communication with the MN and the SN in DC.

According to various embodiment, the wireless device may identify, among indexes related to the SN mobility commands, one or more indexes for which SN mobility conditions are satisfied. Throughout the disclosure, if SN mobility condition for a candidate target PScell is satisfied, an index related to a SN mobility command of the target cell may be referred to as 'an index for which SN mobility condition is satisfied'. The wireless device may identify, among the candidate target PScells, one or more candidate target PScells related to one or more SN mobility commands having the one or more indexes. The wireless device may select a target cell among the one or more candidate target PScells for a SN mobility.

According to various embodiments, the wireless device may be in communication with a MN and a SN in DC. The wireless device may identify a SN change command of the target PScell. The wireless device may apply parameter values in the SN change command of the target PScell to perform a SN change from the SN to another Sn related to the target PScell.

According to various embodiments, the wireless device may identify a SN addition command of the target PScell. The wireless device may apply parameter values in the SN addition command of the target PScell to perform a SN addition for a RAN node related to the target PScell.

Figure 12:
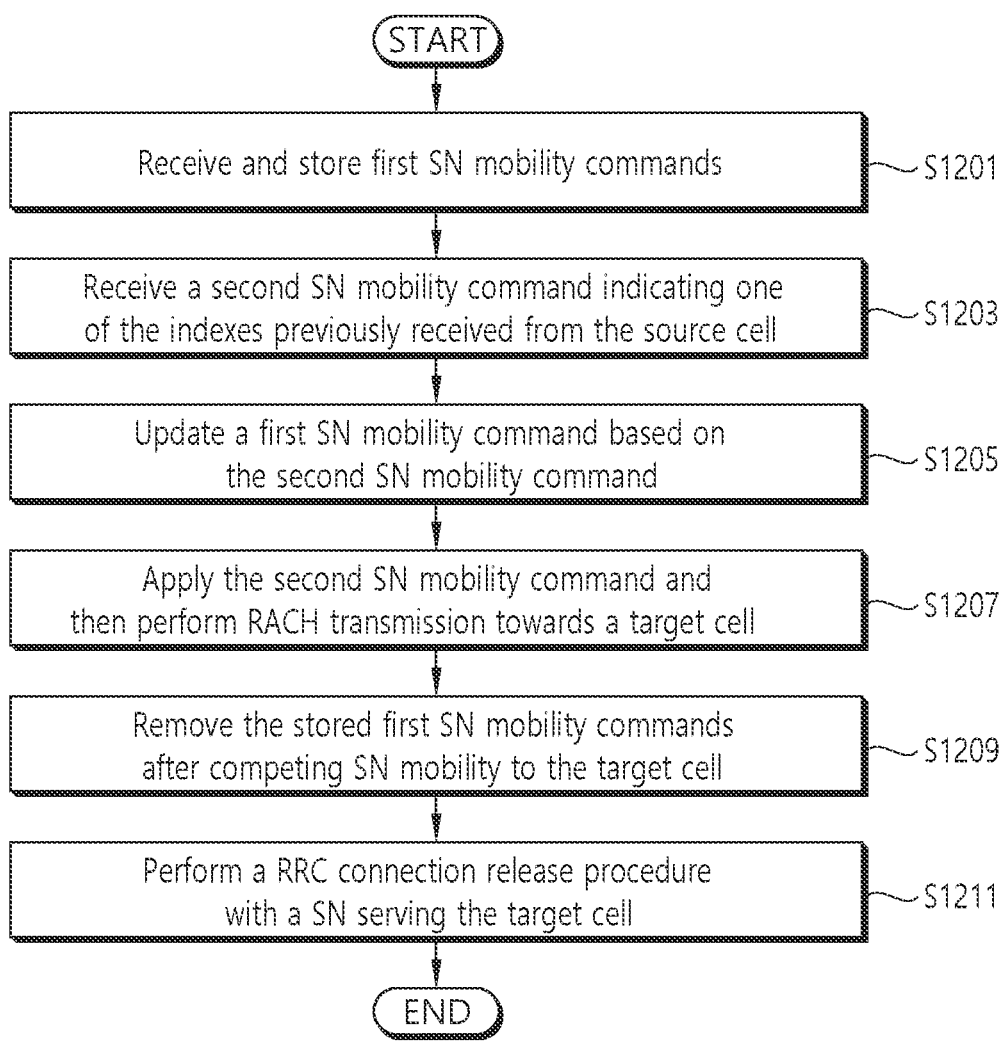
FIG. 12 shows an example of a method to perform a SN mobility to a target PScell according to an embodiment of the present disclosure.

FIG. 12 shows an example of a method to perform a SN mobility to a target PScell according to an embodiment of the present disclosure. The steps illustrated in FIG. 12 may be performed by a wireless device and/or a UE.

Referring to FIG. 12, in step S1201, the UE may receive and store first SN mobility commands. While connected to a source cell, the UE may receive and store more than one first mobility commands (i.e., first SN mobility commands) from a source cell. Different mobility commands may be used for mobility to different first target cells (i.e., first target PScell). The first target cells may be cells which the UE may finally configure as serving cells. Different mobility commands may be identified by different indexes (e.g., target cell ID). The UE may also receive the indexes related to the first mobility commands together with the first mobility commands from the source cell.

In step S1203, the UE may receive a second SN mobility command indicating one of the indexes previously received from the source cell. While connected to the source cell, UE may receive a second mobility command (i.e., second SN mobility command) indicating one of the indexes previously received from the source cell. The second mobility command may be used for mobility to the second target cell (i.e., second target PScell). The second target cell may be one of the first target cells or a target cell other than the first target cells which UE may finally configure as a serving cell. The second mobility command may be associated with a mobility condition for mobility to the second target cell.

In step S1205, the UE may update the first SN mobility command based on the second SN mobility command. If a particular parameter value included in a first mobility command (i.e., first SN mobility command) identified by the indicated index among the first mobility commands is absent in the second mobility command (i.e., second SN mobility command), UE may add the particular parameter value to the second mobility command to obtain the updated first mobility command. That is, the UE may replace parameter values included in the first mobility command with those included in the second mobility command to obtain the updated first mobility command. The first mobility command may be associated with a validity time. UE may start a timer upon receiving the first mobility command. If the timer reaches the validity time, the timer expires and so UE may invalidate the first mobility command. If the first mobility command is valid based on the validity time (i.e., the timer has not reached the validity time and/or the timer has not expired), UE may add the particular parameter value to the second mobility command. If the first mobility command is invalid based on the validity time (i.e., the timer has reached the validity time and/or the timer has expired), UE may apply the second mobility command without adding the particular parameter to the second mobility command or may discard the second mobility command. The UE may remove association between the indicated index and the first mobility command, and then consider that the indicated index is reused for the second mobility command after storing the second mobility command. Alternatively, if a new index is received for the second mobility command in addition to the index related to the first mobility command, UE may keep storing the first mobility command in association with the indicated index and store the second mobility command in associated with the new index.

In step S1207, the UE may apply the second SN mobility command and then perform RACH transmission towards a target cell. If mobility condition for the second target cell is met for mobility to the second target cell, UE may apply the second mobility command (i.e., second SN mobility command) with the added parameter value and then perform RACH transmission (i.e., random access preamble) towards the second target cell for mobility. Then, the UE may receive an uplink grant as a response, and transmit a mobility complete message to the second target cell based on the uplink grant if the UE successfully performed a mobility to the second target cell. If RACH-less mobility is configured, the UE may not perform the RACH transmission. Instead, the UE may transmit a mobility complete message to the second target cell based on an uplink grant previously received before, if the UE successfully performed a mobility to the second target cell.

In step S1209, the UE may remove the stored first SN mobility commands after completing SN mobility to the target cell (e.g., after transmitting the SN mobility complete message to the second target PScell).

In step S1211, the UE may perform a RRC connection release procedure with a SN serving the target PScell. For example, while communicating with the second target cell, the UE may perform RRC connection release procedure with a RAN node serving the second target cell.

Figure 13:
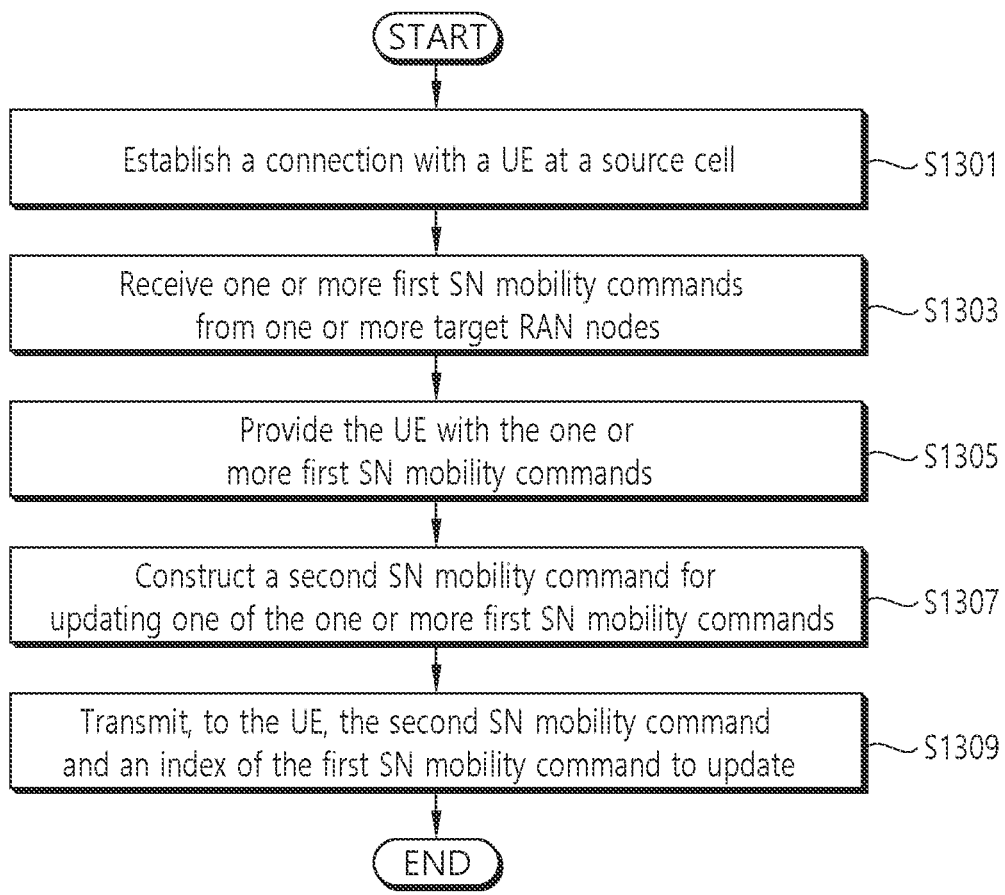
FIG. 13 shows an example of a method for performing a SN mobility to a target PScell according to an embodiment of the present disclosure.

FIG. 13 shows an example of a method for performing a SN mobility to a target PScell according to an embodiment of the present disclosure. The steps illustrated in FIG. 13 may be performed by a source RAN node (or, source gNB, source eNB, source base station, source cell).

Referring to FIG. 13, in step S1301, the source RAN node may establish a connection with a UE at a source cell.

In step S1303, the source RAN node may receive one or more first SN mobility commands from one or more target RAN nodes. The source RAN node may request the first mobility commands (i.e., first SN mobility commands) to the target RAN nodes via mobility request messages and then the target RAN nodes may provide the first mobility commands to the source RAN node via mobility request ACK messages. Different first mobility commands may be identified by different indexes. The index value may be set by the source RAN node or the target RAN nodes. The index may be associated with a cell of the target RAN nodes and may be the identity of the associated cell of the target RAN nodes.

In step S1305, the source RAN node may provide the UE with the one or more first SN mobility commands. Different first mobility commands (i.e., first SN mobility commands) may be identified by different indexes. Different mobility commands may be used for UE's mobility to different first target cells (i.e., first target PScells). Different first mobility commands may be contained in different containers of a RRC message (e.g., conditional reconfiguration message or CHO configuration message) delivered to the UE. The first mobility command may be associated with a mobility condition for UE's mobility to a target cell. The source RAN node may provide the UE with the mobility condition as well as the first mobility command.

In step S1307, the source RAN node may construct a second SN mobility command for updating one of the one or more SN mobility commands. The source RAN node or one of the target RAN nodes may choose one of the first mobility commands (i.e., first SN mobility commands) and the construct a second mobility command (i.e., second SN mobility command) in which a particular parameter value included in the chosen first mobility command is absent. The index identifying the chosen first mobility command or a new index may be used to identify the second mobility command. The absent particular parameter value may be implicitly included in the second mobility command. If one of the target RAN nodes construct the second mobility command, the source gNB may receive the second mobility commands from the target RAN node. The second mobility command may be used for UE's mobility to the second target cell (i.e., second target PScell). The second mobility command may be associated with a mobility condition for mobility to the second target cell. If the mobility condition is met for mobility to the second target cell, UE may apply the second mobility command with the added parameter value and then perform RACH transmission towards the second target cell for mobility. However, if RACH-less mobility is configured, the UE may not perform the RAH transmission. The first mobility command may be associated with a validity time. UE may start a timer upon receiving the first mobility command. If the timer reaches the validity time, the timer expires and so UE may invalidate the first mobility command. The particular parameter value can be absent only if the first mobility command is valid based on the validity time (i.e., the timer has not reached the validity time and/or the timer has not expired).

In step S1309, the source RAN node may transmit, to the UE, the second SN mobility command and an index of the first SN mobility command to update. The source RAN node may transmit the second mobility command (i.e., second SN mobility command) to the UE with the index that was previously received by the UE. The second mobility command may be used for mobility to the second target cell. The second mobility command may be associated with a mobility condition for mobility to the second target cell. The source RAN node may provide the UE with the mobility condition as well as the second mobility command. The second mobility command may be associated with a target cell of the target RAN nodes. If a particular parameter value included in the first mobility command (i.e., first SN mobility command) identified by the indicated index is absent in the second mobility command, UE may add the particular parameter value to the second mobility command to obtain the updated first mobility command. That is, the UE may replace parameter values included in the first mobility command with those included in the second mobility command to obtain the updated first mobility command.

After step S1309, if the target RAN node receives an uplink message (i.e., SN mobility complete message) from the UE at a target cell associated with the index and the second mobility command (i.e., second SN mobility command), the target RAN node may consider mobility (i.e., SN mobility) to be successfully completed for the UE. The target RAN node may apply the second mobility command to the UE. The uplink message (i.e., mobility complete message) may be transmitted via RACH procedure initiated by the UE. If RACH-less mobility is configured, the UE may not perform the RAH transmission. Instead, the UE may transmit a mobility complete message to the second target cell based on an uplink grant previously received before, if the UE successfully performed a mobility to the second target cell.

After completing a SN mobility to the target PScell, the target RAN node related to the target PScell may serve the UE, and the target RAN node and the target PScell may become a serving SN and a serving PScell for the UE, respectively. While communicating with the UE, the serving SN may transmit a RRC release message to the UE in case of RRC connection release.

Figure 14:
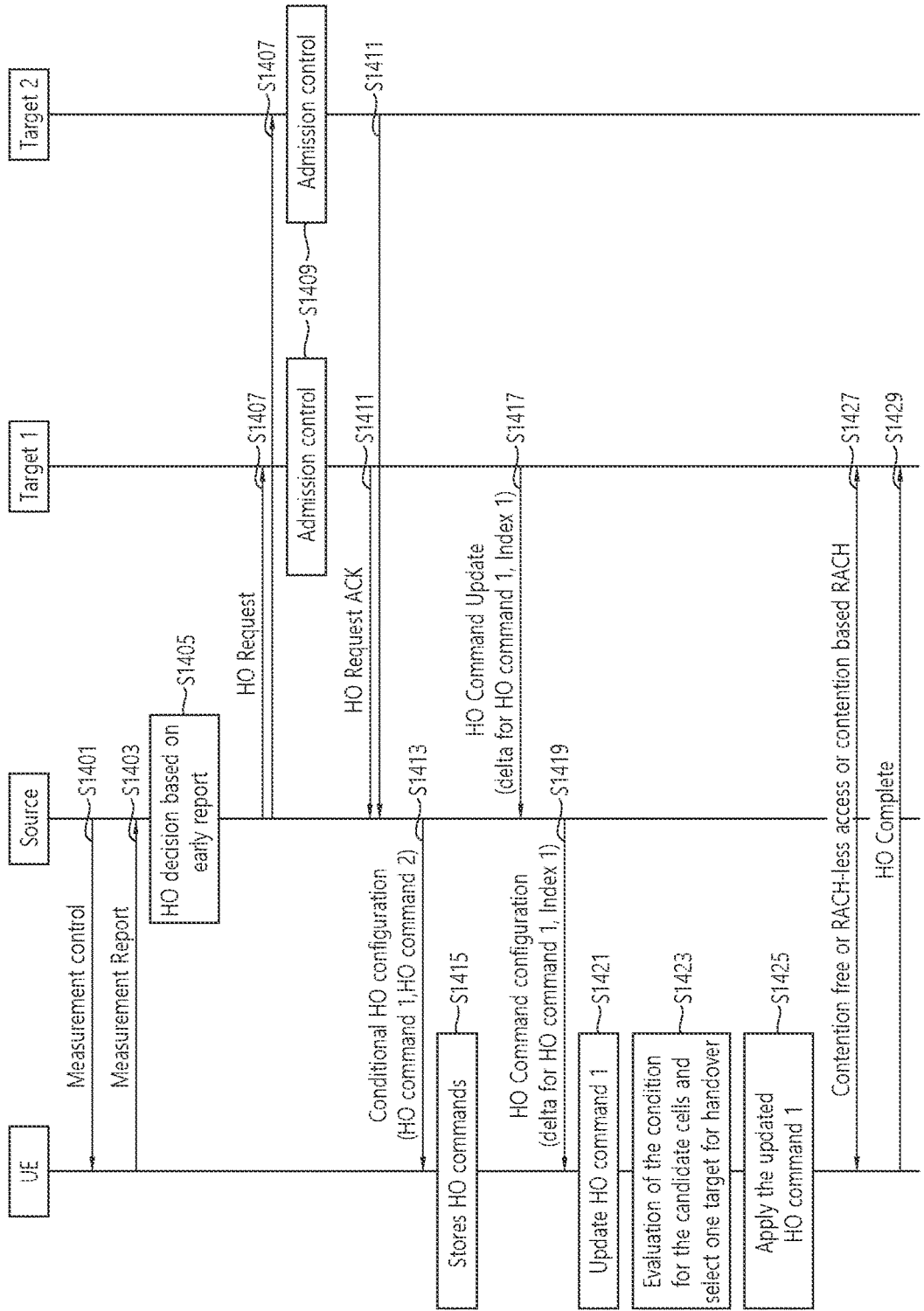
FIG. 14 shows an example of signal flows for updating a SN mobility command in a SN mobility procedure according to an embodiment of the present disclosure.

FIG. 14 shows an example of signal flows for updating a SN mobility command in a SN mobility procedure according to an embodiment of the present disclosure. FIG. 14 illustrates steps for the conditional handover procedure exemplary, but the illustrated steps can also be applied to a conditional SN mobility procedure (e.g., conditional SN addition procedure and/or conditional SN change procedure). The steps performed by UE in FIG. 14 can also be performed by a wireless device.

Referring to FIG. 14, in step S1401, while the UE is connected to a source cell of a source RAN node, the UE may receive a measurement control message comprising a measurement configuration from the source RAN node. That is, measurement may be configured by the source RAN node via the measurement control message. The UE may perform measurement based on the measurement configuration. Though not illustrated in FIG. 14, before step S1401, the UE may establish a connection with a source RAN node at a source cell. To establish a connection with the source RAN node, the UE may perform initial access towards the source cell, and/or perform RACH procedure towards the source cell.

In step S1403, if a measurement report is triggered, the UE may send the measurement report to the source RAN node.

In step S1405, the source RAN node may make a HO decision based on the measurement report. That is, based on the measurement report or so, the source RAN node may select one or more target cells (e.g., target cell 1 and target cell 2) of one or more target gNBs for conditional handover.

In step S1407, the source RAN node may transmit HO request messages to the target cell 1 and the target cell 2. The source RAN node may request conditional handover to the target RAN nodes via the HO request messages.

In step S1409, each of the target cell 1 and the target cell 2 may perform an admission control based on information included in the HO request message. The target cell may configure and reserve the required resources (e.g., C-RNTI and/or RACH preamble).

In step S1411, the target RAN nodes may provide their handover commands (i.e., handover command 1 of the target cell 1, and handover command 2 of the target cell 2) to the source RAN node via HO request ACK messages. The first handover commands (i.e., HO command 1 and HO command 2) may be identified by different indexes. For example, HO command 1 may be identified by index 1, and HO command 2 may be identified by index 2. The index value may be set by the source RAN node or the target RAN nodes. The index may be associated with the target cell of the target gNBs. For example, the index may be the identity of the associated cell of the target gNBs. The source RAN node may receive two handover commands from the target RAN nodes. Different handover commands, (i.e. HO command 1 & 2) may be used for handover to different target cells (i.e. target cell 1 & 2). For example, HO command 1 may be used for handover to target cell 1, and HO command 2 may be used for handover to target cell 2. Different handover commands may be identified by different indexes.

In step S1413, the source RAN node may construct a RRC message (e.g., conditional reconfiguration message or CHO configuration message) containing two handover commands received from the target RAN nodes, and then transmit the RRC message to the UE. While connected to the source cell, UE may receive the RRC message including the handover commands. Each handover command may indicate/be related to an index and a handover condition.

In step S1415, the UE may store the received handover commands with their indexes and handover conditions.

At least one of the target RAN nodes may update its handover command. Alternatively, the source RAN node may update one of the handover commands. For updating the handover command, the source RAN node or the target RAN nodes may choose the handover command previously transmitted to the UE, and then construct an updated handover command in which a particular parameter value included in the chosen handover command is absent. If one of the target RAN nodes (e.g., target cell 1) updates the handover command, in step S1417, the target RAN node (e.g., target cell 1) may provide the updated handover command (e.g., delta for HO command 1) to the source RAN node with an index (e.g., index 1) related to the handover command.

In step S1419, the source RAN node may transmit the updated handover command to the UE with the index associated with the chosen previous handover command. The updated handover command may be used for handover to the target cell 1. The updated handover command may be associated with a mobility condition for handover to the target cell 1. While connected to the source cell, UE may receive the updated handover command for the target cell 1.

In step S1421, UE may update HO command 1. If a particular parameter value included in the previous handover command identified by the indicated index is absent in the updated handover command, UE may add the particular parameter value to the updated handover command. That is, the UE may replace parameter values included in the previous handover command with those included in the updated handover command. The handover command may be associated with a validity time. UE may start a timer upon receiving a handover command. If the timer reaches the validity time, the timer expires and so UE may invalidate the handover command. If the handover command is valid based on the validity time (i.e., the timer has not reached the validity time and/or the timer has not expired) and an updated handover command is received, UE may add the particular parameter value to the updated handover command. If the handover command is invalid based on the validity time (i.e., the timer has reached the validity time and/or the timer has expired), UE may apply the updated handover command without the particular parameter or discards the updated handover command.

To identify the updated handover command, the index identifying the previous handover command or a new index may be used. For example, UE may remove association between the indicated index and the previous handover command from UE's storage. Then, UE may consider the indicated index is reused for the updated handover command after storing the updated handover command. Alternatively, if a new index is received together with the updated handover command in addition to the index related to the previous handover command, UE may keep storing the previous handover command in association with the indicated index while storing the updated handover command in association with the new index for the target cell 1.

In step S1423, the UE may evaluate handover condition for target cells and select a target cell for handover. For example, the UE may perform measurements on two target cells (e.g., target cell 1 and target cell 2). Based on a result of the measurements, the UE may identify that the handover condition is met for handover to the target cell 1.

In step S1425, the UE may apply the handover command stored for the target cell 1 with the added parameter value. Then, UE may synchronize to downlink of the target cell 1.

In step S1427, the UE may perform RACH transmission towards the target cell 1. In a random access procedure, the UE may receive an uplink grant. If RACH-less handover is configured, the step S1427 may be omitted, and the uplink grant may be provided in advance.

In step S1429, the UE may transmit a MAC PDU containing a handover complete message to the target cell 1 based on the uplink grant. After successfully completing handover, the UE may remove the handover commands stored for the other target cell (e.g., target cell 2) from UE's storage.

So far, conditional SN mobility is described. Conditional SN mobility is a kind of conditional reconfiguration. Hereinafter, Conditional reconfiguration is described.

The network may configure the UE with conditional reconfiguration (i.e., conditional handover and/or conditional PSCell addition/change) including per candidate target cell an RRCConnectionReconfiguration (i.e., conditional SN mobility command) to only be applied upon the fulfilment of an associated execution condition (i.e., SN mobility condition).

For conditional reconfiguration, the UE shall:
1> if the received conditionalReconfiguration includes the condReconfigurationToRemoveList:
2> perform the conditional reconfiguration removal procedure;
1> if the received conditionalReconfiguration includes the condReconfigurationToAddModList:
2> perform the conditional reconfiguration addition/modification procedure.

I. Conditional Reconfiguration Addition/Modification
The UE shall:
1> for each condReconfigurationId (i.e., index related to a SN mobility command) included in the received condReconfigurationToAddModList:
2> if an entry with the matching condReconfigurationId exists in the condReconfigurationList within the VarConditionalReconfiguration (i.e., list of {index, SN mobility condition, SN mobility command} for each target cell stored in the UE):
3> replace the entry with the values received for this condReconfigurationId;

2> else:

3> add a new entry for this condReconfigurationId within the VarConditionalReconfiguration;

3> store the associated RRCConnectionReconfiguration (i.e., SN mobility command and/or SN mobility condition) in VarConditionalReconfiguration;

2> monitor the triggering conditions (i.e., SN mobility conditions) associated to the measurement identities of that condReconfigurationId;

II. Conditional Reconfiguration Removal

The UE shall:

1> for each condReconfigurationId included in the received condReconfigurationToRemoveList that is part of the current UE configuration in VarConditionalReconfiguration:

2> stop the monitoring of triggering conditions linked by the measurement identities;

2> remove the entry with the matching condReconfigurationId from the condReconfigurationList within the VarConditionalReconfiguration;

The UE does not consider the conditional reconfiguration message as erroneous if the condReconfigurationToRemoveList includes any condReconfigurationId value that is not part of the current UE configuration.

III. Conditional Reconfiguration Execution

For the measId for which the triggering condition for conditional reconfiguration was fulfilled, the UE shall:

1> for each condReconfigurationId within the VarConditionalReconfiguration that has that measId associated to its stored RRCConnectionReconfiguration (i.e., SN mobility command):

2> if all triggering conditions are fulfilled for that condReconfigurationId:

3> consider the target cell candidate within the stored RRCConnectionReconfiguration, associated to that condReconfigurationId, as a triggered cell;

1> if the more than one triggered cell exists:

2> select one of the triggered cells as the selected cell for conditional reconfiguration;

1> for the selected cell of conditional reconfiguration::

2> if the stored RRCConnectionReconfiguration associated to the selected cell includes mobilityControlInfo (conditional handover):

3> apply the stored RRCConnectionReconfiguration associated to that condReconfigurationId and perform a handover to the selected cell;

2> else if the stored RRCConnectionReconfiguration includes nr-Config (conditional PSCell addition/change):

3> apply the stored RRCConnectionReconfiguration associated to that condReconfigurationId and perform the SN change/addition procedure for the selected cell;

If multiple cells are triggered in conditional PSCell addition/change execution, the UE may consider beams and beam quality to select one of the triggered cells for execution.

The structure of the conditional reconfiguration message or the information element (IE) ConditionalReconfiguration may be as the following Table 5. The IE ConditionalReconfiguration may be used to add, modify or release the configuration of a conditional handover, a conditional PSCell addition/change per target candidate cell.

TABLE 5

```
-- ASN1START
ConditionalReconfiguration-r16 ::= SEQUENCE {
condReconfigurationToAddModList-r16      CondReconfigurationToAddModList-r16
OPTIONAL, -- Need ON
condReconfigurationToRemoveList-r16      CondReconfigurationToRemoveList-r16
OPTIONAL, -- Need ON
...
}
CondReconfigurationToRemoveList-r16 ::= SEQUENCE (SIZE (1..maxCondConfig-r16))
OF CondReconfigurationId-r16
-- ASN1STOP
```

In Table 5, condReconfigurationToAddModList may refer to list of conditional reconfigurations (i.e. conditional handover or conditional PSCell change/addition) to add and/or modify. Also, condReconfigurationToRemoveList may refer to list of conditional reconfigurations (i.e. conditional handover or conditional PSCell change/addition) to remove. CondReconfigurationId may refer to an index related to a SN mobility command. The contents of the IE CondReconfigurationId may be as the following Table 6. The IE ConditionalReconfigurationId may be used to identify a conditional reconfiguration.

TABLE 6

```
-- ASN1START
CondReconfigurationId-r16 : := INTEGER (1.. maxCondConfig-r16)
-- ASN1STOP
```

In Table 6, maxCondConfig may refer to the maximum number of conditional reconfigurations (i.e., CondReconfigurationAddMods). The structure of IE CondReconfigurationToAddModList may be as the following Table 7. The IE CondReconfigurationToAddModList may concern a list of conditional reconfigurations (i.e. conditional handover, conditional PSCell addition/change) to add or modify, with for each entry the measId (associated to the triggering condition configuration) and the associated RRCConnectionReconfiguration.

TABLE 7

```
-- ASN1START
CondReconfigurationToAddModList-r16 ::= SEQUENCE (SIZE (1..maxCondConfig-r16))
OF CondReconfigurationAddMod-r16
CondReconfigurationAddMod-r16 ::= SEQUENCE 1
condReconfigurationId-r16    CondReconfigurationId-r16,
```

TABLE 7-continued

```
triggerCondition-r16      SEQUENCE (SIZE (1..2)) OF MeasId,
condReconfigurationToApply-r16       OCTET   STRING    (CONTAINING
RRCConnectionReconfiguration),
...
}
-- ASN1STOP
```

In Table 7, CondReconfigurationAddMod may refer to a conditional reconfiguration for a target cell. CondReconfigurationId may refer to an index of the CondReconfigurationAddMod, which may be related to a SN mobility command of the target cell. The triggerCondition may refer to a SN mobility condition for the target cell. The RRCConnectionReconfiguration contained in the condReconfigurationToApply may refer to a SN mobility command of the target cell. As described above, the conditional reconfiguration may also be referred to as CHO configuration. The structure of the CHO configuration or IE CHOConfiguration may be as the following Table 8:

TABLE 8

```
CHOConfiguration ::+=           SEQUENCE {
choToReleaseList-r16       CHOToReleaseList-r16    OPTIONAL,
       --Need N
choToAddModList-r16              CHOToAddModList-r16
       OPTIONAL     -- Need N
choConditionList             SEQUENCE (SIZE (1..maxFFS)) OF CHOCondition-r16
OPTIONAL
}
CHOToReleaseList-r16 ::=   SEQUENCE (SIZE (1..maxCHO)) OF CHOToRelease-
r16
CHOToRelease-r16 ::=         SEQUENCE {
choId-r16 INTEGER (1. .maxCHO)
}
CHOToAddModList-r16 ::= SEQUENCE (SIZE (1..maxCHO)) OF CHOToAddMod-
r16
CHOToAddMod-r16 ::=          SEQUENCE {
choId-r16 INTEGER
(1..maxCHO),
conditionId-r16 ReportConfigId
       OPTIONAL,     -- Need M
choCellConfiguration-r16             OCTET STRING (CONTAINING FFS
for CHOCellConfiguration-r16) OPTIONAL, -- Need M
}
```

In Table 8, CHOToReleaseList may correspond to condReconfigurationToRemoveList. CHOToAddModList may correspond to CondReconfigurationToAddModList. CHOCondition may correspond to triggerCondition. The maxCHO may correspond to maxCondConfig. That is, the maxCHO may refer to the maximum number of CHO configurations (i.e., CHOToAddMods). The choId may correspond to condReconfigurationId. CHOToAddMod may correspond to CondReconfigurationToAddMod, which may refer to a CHO configuration for a target cell. The choId may refer to an index of the CondReconfigurationToAddMod, which may be related to a SN mobility command of the target cell. The conditionId may refer to an index of the CHOCondition (i.e., SN mobility condition for the target cell), which may be related to a choConditionConfig. The CHOCellConfiguration contained in the choCellConfiguration may refer to a SN mobility command of the target cell. The choCellConfiguration may correspond to condReconfigurationToApply. The structure of IE CHOCondition may be as the following Table 9:

TABLE 9

```
ASN1START
TAG-CHOTRIGGERCONDITION-START
CHOCondition-r16-IEs ::=   SEQUENCE {
conditionId-r16        ReportConfigId
choConditionConfig           CHOConditionConfig-r16    OPTIONAL
   -- Cond NewID
}
CHOConditionConfig-r16-IE ::=              SEQUENCE {
eventId                CHOICE {
eventA3                SEQUENCE {
a3-Offset              MeasTriggerQuantityOffset,
```

TABLE 9-continued

```
hysteresis             Hysteresis,
timeToTrigger          TimeToTrigger,
},
eventA5                SEQUENCE {
a5-Threshold1          MeasTriggerQuantity,
a5-Threshold2          MeasTriggerQuantity,
*350                   hysteresis             Hysteresis,
timeToTrigger          TimeToTrigger,
},
...
},
rsType                 NR-RS-Type,
...
}
TAG-CHOTRIGGERCONDITION-STOP
-- ASN1STOP
```

Figure 15:
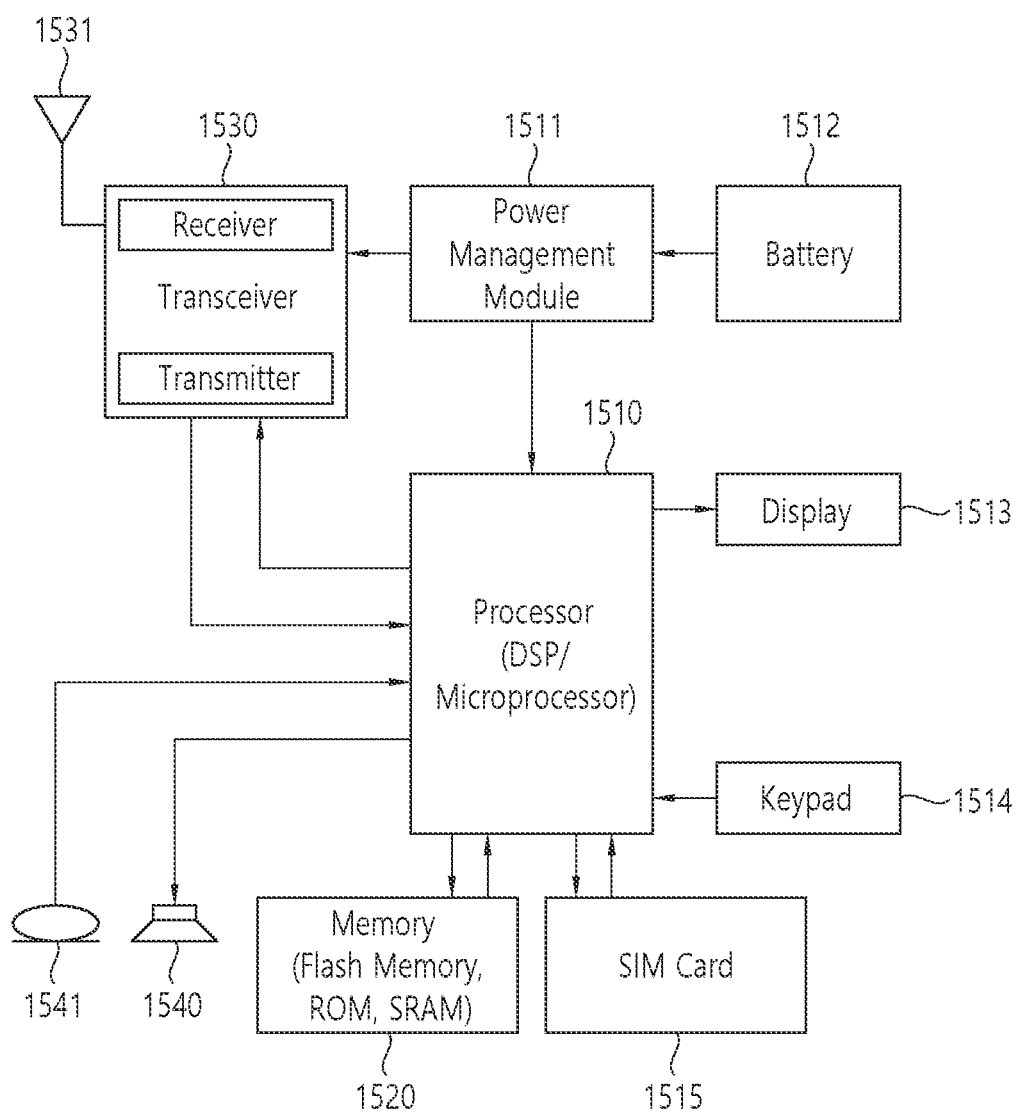
FIG. 15 shows a UE to implement an embodiment of the present disclosure.

FIG. 15 shows a UE to implement an embodiment of the present disclosure. The present disclosure described above for UE side may be applied to this embodiment. A UE includes a processor 1510, a power management module 1511, a battery 1512, a display 1513, a keypad 1514, a subscriber identification module (SIM) card 1515, a memory 1520, a transceiver 1530, one or more antennas 1531, a speaker 1540, and a microphone 1541.

The processor 1510 may be configured to implement proposed functions, procedures and/or methods described in this description. Layers of the radio interface protocol may be implemented in the processor 1510. The processor 1510 may include application-specific integrated circuit (ASIC), other chipset, logic circuit and/or data processing device. The processor 1510 may be an application processor (AP). The processor 1510 may include at least one of a digital signal processor (DSP), a central processing unit (CPU), a graphics processing unit (GPU), a modem (modulator and demodulator). An example of the processor 1510 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1510 may be configured to, or configured to control the transceiver 1530 to implement steps performed by the UE and/or the wireless device throughout the disclosure.

The power management module 1511 manages power for the processor 1510 and/or the transceiver 1530. The battery 1512 supplies power to the power management module 1511. The display 1513 outputs results processed by the processor 1510. The keypad 1514 receives inputs to be used by the processor 1510. The keypad 1514 may be shown on the display 1513. The SIM card 1515 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1520 is operatively coupled with the processor 1510 and stores a variety of information to operate the processor 1510. The memory 1520 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

The transceiver 1530 is operatively coupled with the processor 1510, and transmits and/or receives a radio signal. The transceiver 1530 includes a transmitter and a receiver. The transceiver 1530 may include baseband circuitry to process radio frequency signals. The transceiver 1530 controls the one or more antennas 1531 to transmit and/or receive a radio signal.

The speaker 1540 outputs sound-related results processed by the processor 1510. The microphone 1541 receives sound-related inputs to be used by the processor 1510.

Figure 16:
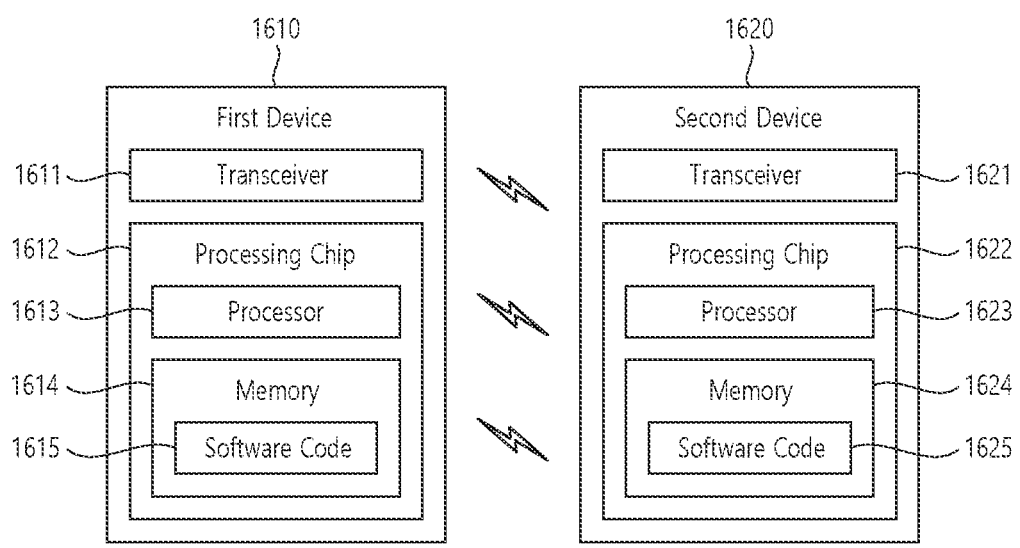
FIG. 16 shows another example of a wireless communication system to which the technical features of the present disclosure can be applied.

FIG. 16 shows another example of a wireless communication system to which the technical features of the present disclosure can be applied.

Referring to FIG. 16, the wireless communication system may include a first device 1610 (i.e., first device 210) and a second device 1620 (i.e., second device 220).

The first device 1610 may include at least one transceiver, such as a transceiver 1611, and at least one processing chip, such as a processing chip 1612. The processing chip 1612 may include at least one processor, such a processor 1613, and at least one memory, such as a memory 1614. The memory may be operably connectable to the processor 1613. The memory 1614 may store various types of information and/or instructions. The memory 1614 may store a software code 1615 which implements instructions that, when executed by the processor 1613, perform operations of the first device 910 described throughout the disclosure. For example, the software code 1615 may implement instructions that, when executed by the processor 1613, perform the functions, procedures, and/or methods of the first device 1610 described throughout the disclosure. For example, the software code 1615 may control the processor 1613 to perform one or more protocols. For example, the software code 1615 may control the processor 1613 to perform one or more layers of the radio interface protocol.

The second device 1620 may include at least one transceiver, such as a transceiver 1621, and at least one processing chip, such as a processing chip 1622. The processing chip 1622 may include at least one processor, such a processor 1623, and at least one memory, such as a memory 1624. The memory may be operably connectable to the processor 1623. The memory 1624 may store various types of information and/or instructions. The memory 1624 may store a software code 1625 which implements instructions that, when executed by the processor 1623, perform operations of the second device 1620 described throughout the disclosure. For example, the software code 1625 may implement instructions that, when executed by the processor 1623, perform the functions, procedures, and/or methods of the second device 1620 described throughout the disclosure. For example, the software code 1625 may control the processor 1623 to perform one or more protocols. For example, the software code 1625 may control the processor 1623 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 17:
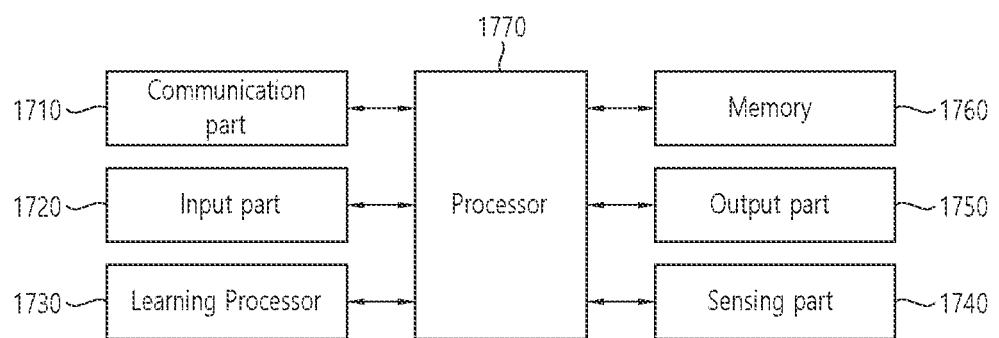
FIG. 17 shows an example of an AI device to which the technical features of the present disclosure can be applied.

FIG. 17 shows an example of an AI device to which the technical features of the present disclosure can be applied.

The AI device 1700 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 17, the AI device 1700 may include a communication part 1710, an input part 1720, a learning processor 1730, a sensing part 1740, an output part 1750, a memory 1760, and a processor 1770.

The communication part 1710 can transmit and/or receive data to and/or from external devices such as the AI devices and the AI server using wire and/or wireless communication technology. For example, the communication part 1710 can transmit and/or receive sensor information, a user input, a learning model, and a control signal with external devices. The communication technology used by the communication part 1710 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1720 can acquire various kinds of data. The input part 1720 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1720 can acquire input data to be used when acquiring an output using learning data and a learning model for model learning. The input part 1720 may obtain raw input data, in which case the processor 1770 or the learning processor 1730 may extract input features by preprocessing the input data.

The learning processor 1730 may learn a model composed of an ANN using learning data. The learned ANN can be referred to as a learning model. The learning model can be used to infer result values for new input data rather than learning data, and the inferred values can be used as a basis for determining which actions to perform. The learning processor 1730 may perform AI processing together with the learning processor of the AI server. The learning processor 1730 may include a memory integrated and/or implemented in the AI device 1700. Alternatively, the learning processor 1730 may be implemented using the memory 1760, an external memory directly coupled to the AI device 1700, and/or a memory maintained in an external device.

The sensing part 1740 may acquire at least one of internal information of the AI device 1700, environment information of the AI device 1700, and/or the user information using various sensors. The sensors included in the sensing part 1740 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1750 may generate an output related to visual, auditory, tactile, etc. The output part 1750 may include a display unit for outputting visual information, a speaker for outputting auditory information, and/or a haptic module for outputting tactile information.

The memory 1760 may store data that supports various functions of the AI device 1700. For example, the memory 1760 may store input data acquired by the input part 1720, learning data, a learning model, a learning history, etc.

The processor 1770 may determine at least one executable operation of the AI device 1700 based on information determined and/or generated using a data analysis algorithm and/or a machine learning algorithm. The processor 1770 may then control the components of the AI device 1700 to perform the determined operation. The processor 1770 may request, retrieve, receive, and/or utilize data in the learning processor 1730 and/or the memory 1760, and may control the components of the AI device 1700 to execute the predicted operation and/or the operation determined to be desirable among the at least one executable operation. The processor 1770 may generate a control signal for controlling the external device, and may transmit the generated control signal to the external device, when the external device needs to be linked to perform the determined operation. The processor 1770 may obtain the intention information for the user input and determine the user's requirements based on the obtained intention information. The processor 1770 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1730 and/or learned by the learning processor of the AI server, and/or learned by their distributed processing. The processor 1770 may collect history information including the operation contents of the AI device 1700 and/or the user's feedback on the operation, etc. The processor 1770 may store the collected history information in the memory 1760 and/or the learning processor 1730, and/or transmit to an external device such as the AI server. The collected history information can be used to update the learning model. The processor 1770 may control at least some of the components of AI device 1700 to drive an application program stored in memory 1760. Furthermore, the processor 1770 may operate two or more of the components included in the AI device 1700 in combination with each other for driving the application program.

Figure 18:
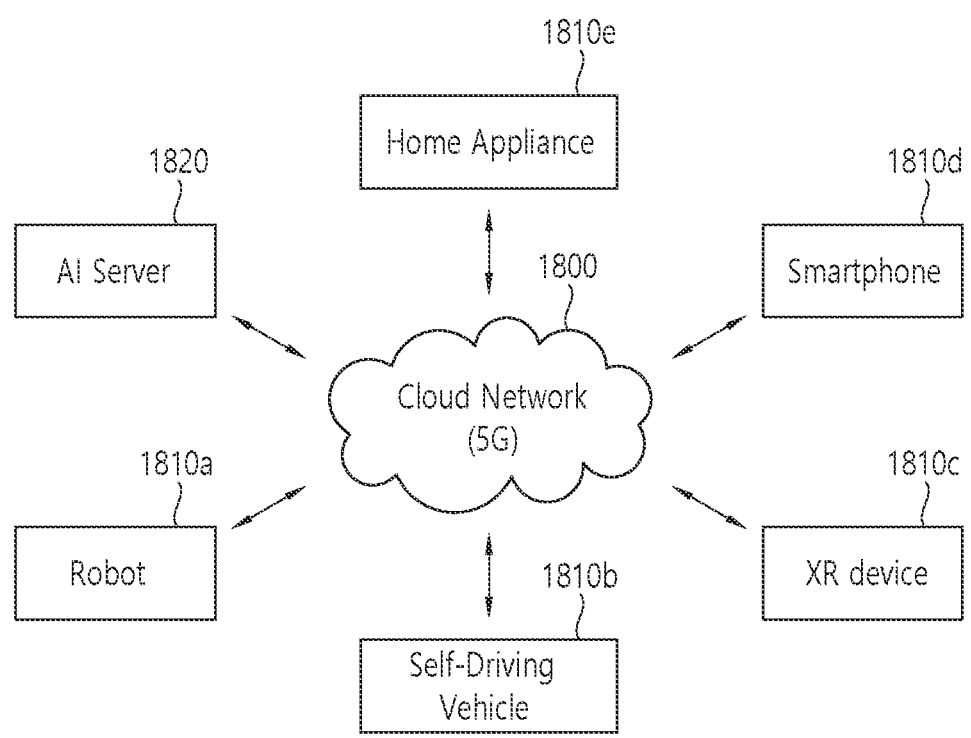
FIG. 18 shows an example of an AI system to which the technical features of the present disclosure can be applied.

FIG. 18 shows an example of an AI system to which the technical features of the present disclosure can be applied.

Referring to FIG. 18, in the AI system, at least one of an AI server 1820, a robot 1810a, an autonomous vehicle 1810b, an XR device 1810c, a smartphone 1810d and/or a home appliance 1810e is connected to a cloud network 1800. The robot 1810a, the autonomous vehicle 1810b, the XR device 1810c, the smartphone 1810d, and/or the home appliance 1810e to which the AI technology is applied may be referred to as AI devices 1810a to 1810e.

The cloud network 1800 may refer to a network that forms part of a cloud computing infrastructure and/or resides in a cloud computing infrastructure. The cloud network 1800 may be configured using a 3G network, a 4G or LTE network, and/or a 5G network. That is, each of the devices 1810a to 1810e and 1820 consisting the AI system may be connected to each other through the cloud network 1800. In particular, each of the devices 1810a to 1810e and 1820 may communicate with each other through a base station, but may directly communicate with each other without using a base station.

The AI server 1820 may include a server for performing AI processing and a server for performing operations on big data. The AI server 1820 is connected to at least one or more of AI devices constituting the AI system, i.e. the robot 1810a, the autonomous vehicle 1810b, the XR device 1810c, the smartphone 1810d and/or the home appliance 1810e through the cloud network 1800, and may assist at least some AI processing of the connected AI devices 1810a to 1810e. The AI server 1820 can learn the ANN according to the machine learning algorithm on behalf of the AI devices 1810a to 1810e, and can directly store the learning models and/or transmit them to the AI devices 1810a to 1810e. The AI server 1820 may receive the input data from the AI devices 1810a to 1810e, infer the result value with respect to the received input data using the learning model, generate a response and/or a control command based on the inferred result value, and transmit the generated data to the AI devices 1810a to 1810e. Alternatively, the AI devices 1810a to 1810e may directly infer a result value for the input data using a learning model, and generate a response and/or a control command based on the inferred result value.

Various embodiments of the AI devices 1810a to 1810e to which the technical features of the present disclosure can be applied will be described. The AI devices 1810a to 1810e shown in FIG. 18 can be seen as specific embodiments of the AI device 1700 shown in FIG. 17.

The present disclosure can have various advantageous effects.

For example, by transmitting an updated SN mobility command including updated configuration parameters and excluding configuration parameters included in a previously transmitted SN mobility command (i.e., configuration parameters that are not updated or remain the same), the network can send a SN mobility command of reduced sized to the wireless device, in particular when multiple target cells are configured for conditional SN mobility.

For example, it is beneficial to reduce signalling overhead in case when multiple target cells are configured for conditional SN mobility or when conditional SN mobility command is updated that the network transmits an updated SN mobility command including updated configuration parameters and excluding configuration parameters included in a previously transmitted SN mobility command (i.e., configuration parameters that are not updated or remain the same).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) in a wireless communication system, the method comprising:
    storing a list of configurations including one or more configurations for conditional primary secondary cell (PSCell) change, each of the one or more configurations for conditional PSCell change being related to a corresponding identifier (ID);
    receiving, from a network, a first configuration for conditional PSCell change related to a first ID;
    updating the list of configurations based on the first ID;
    evaluating a condition associated to each configuration for conditional PSCell change within the list of configurations; and
    performing a random access preamble transmission based on the condition being fulfilled,
    wherein updating the list of configurations comprises:
        based on a second configuration for conditional PSCell change with an ID matching the first ID existing in the one or more configurations for conditional PSCell change within the list of configurations, replacing at least one parameter value in the second configuration for conditional PSCell change with at least one parameter value in the first configuration for conditional PSCell change, and
        based on the second configuration for conditional PSCell change not existing in the one or more configurations for conditional PSCell change within the list of configurations, adding the first configuration for conditional PSCell change within the list of configurations.

2. The method of claim 1, wherein the first configuration for conditional PSCell change comprises at least one of:

the first ID; or a PSCell mobility condition for a first candidate target PSCell.

3. The method of claim 2, wherein the first ID comprises an ID of the first candidate target PSCell.

4. The method of claim 1, wherein the one or more configurations for conditional PSCell change comprise the second configuration for conditional PSCell change, and wherein the first configuration for conditional PSCell change includes one or more parameter values of at least one first entry that are updated from those of the at least one first entry in the second configuration for conditional PSCell change, and excludes one or more parameter values of at least one second entry that are not updated from those of the at least one second entry in the second configuration for conditional PSCell change.

5. The method of claim 4, wherein updating the list of configurations comprises:

identifying, in the second configuration for conditional PSCell change, the one or more parameter values of the at least one second entry that are excluded in the first configuration for conditional PSCell change; and adding the one or more parameter values of the at least one second entry to the first configuration for conditional PSCell change.

6. The method of claim 1, wherein the UE is in communication with a master node (MN) and a secondary node (SN) in a dual connectivity (DC), and wherein the method further comprises performing a PSCell change from a PSCell related to the SN to a target PSCell based on the condition being fulfilled.

7. The method of claim 6, further comprising:

applying one or more parameter values of the target PSCell to perform PSCell change.

8. The method of claim 1, wherein the UE is in communication with at least one of a network or an autonomous vehicle.

9. A wireless device configured to operate in a wireless communication system, the wireless device comprising:

a transceiver;

a memory; and at least one processor operatively coupled to the transceiver and the memory, wherein the memory stores instructions that, based on being executed by the at least one processor, perform operations comprising:

storing a list of configurations including one or more configurations for conditional primary secondary cell (PSCell) change, each of the one or more configurations for conditional PSCell change being related to a corresponding identifier (ID);

receiving, from a network, a first configuration for conditional PSCell change related to a first ID;

updating the list of configurations based on first ID;

evaluating a condition associated to each configuration for conditional PSCell change within the list of configurations; and performing a random access preamble transmission based on the condition being fulfilled, wherein updating the list of configurations comprises:

based on a second configuration for conditional PSCell change with an ID matching the first ID existing in the one or more configurations for conditional PSCell change within the list of configurations, replacing at least one parameter value in the second configuration for conditional PSCell change with at least one parameter value in the first configuration for conditional PSCell change, and based on the second configuration for conditional PSCell change not existing in the one or more configurations for conditional PSCell change within the list of configurations, adding the first configuration for conditional PSCell change within the list of configurations.

10. A non-transitory computer-readable medium having recorded thereon a program for performing each step of a method on a computer, the method comprising:

storing a list of configurations including one or more configurations for conditional primary secondary cell (PSCell) change, each of the one or more configurations for conditional PSCell change being related to a corresponding identifier (ID);

receiving, from a network, a first configuration for conditional PSCell change related to a first ID;

updating the list of configurations based on first ID;

evaluating a condition associated to each configuration for conditional PSCell change within the list of configurations; and performing a random access preamble transmission based on the condition being fulfilled, wherein updating the list of configurations comprises:

based on a second configuration for conditional PSCell change with an ID matching the first ID existing in the one or more configurations for conditional PSCell change within the list of configurations, replacing at least one parameter value in the second configuration for conditional PSCell change with at least one parameter value in the first configuration for conditional PSCell change, and based on the second configuration for conditional PSCell change not existing in the one or more configurations for conditional PSCell change within the list of configurations, adding the first configuration for conditional PSCell change within the list of configurations.

* * * * *